US012363537B2

United States Patent
Cho

(10) Patent No.: US 12,363,537 B2
(45) Date of Patent: Jul. 15, 2025

(54) METHOD, MANAGEMENT SERVER, AND BASE STATION FOR DEFENDING ATTACK FROM FAKE BASE STATION IN COMMUNICATION NETWORK

(71) Applicant: SAMSUNG ELECTRONICS CO., LTD., Suwon-si (KR)

(72) Inventor: Jungil Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 506 days.

(21) Appl. No.: 17/895,530

(22) Filed: Aug. 25, 2022

(65) Prior Publication Data

US 2022/0417753 A1 Dec. 29, 2022

Related U.S. Application Data

(63) Continuation of application No. PCT/KR2021/002305, filed on Feb. 24, 2021.

(30) Foreign Application Priority Data

Feb. 25, 2020 (KR) .......................... 10-2020-0022707

(51) Int. Cl.
*H04M 1/68* (2006.01)
*H04W 12/108* (2021.01)
(Continued)

(52) U.S. Cl.
CPC ....... *H04W 12/122* (2021.01); *H04W 12/108* (2021.01); *H04W 74/0833* (2013.01)

(58) Field of Classification Search
CPC ............. H04W 12/122; H04W 12/108; H04W 74/0833; H04W 88/08; H04W 88/18;
(Continued)

(56) References Cited

U.S. PATENT DOCUMENTS 8,387,141 B1   2/2013   Zhukov et al.
8,732,827 B1   5/2014   Zhukov et al.
(Continued)

FOREIGN PATENT DOCUMENTS

CN          109275145 A      1/2019
KR    10-2006-0132701 A     12/2006
(Continued)

OTHER PUBLICATIONS

Communication dated Jun. 3, 2021, issued by the International Searching Authority in counterpart International Application No. PCT/KR2021/002305 (PCT/ISA/210).
(Continued)

*Primary Examiner* — Amancio Gonzalez
(74) *Attorney, Agent, or Firm* — Sughrue Mion, PLLC

(57) ABSTRACT

A base station of a communication system may include an antenna; a memory; and a processor. The processor analyzes a signal received through the antenna to determine if the received signal is a signal transmitted from a fake base station. Based on a determination that the source of the received signal is the fake base station, the processor generates a random access preamble signal for accessing the fake base station. The processor transmits the generated random access preamble signal through the antenna. Thus, the base station may effectively defend against an attack from a fake base station by detecting the fake base station based on collected information of a neighboring base station and causing radio resources of the detected fake base station to be exhausted. Various other embodiments are possible.

20 Claims, 18 Drawing Sheets

(51) Int. Cl.
*H04W 12/122* (2021.01)
*H04W 74/0833* (2024.01)

(58) Field of Classification Search
CPC ......... H04W 74/004; H04K 3/41; H04K 3/22; H04K 3/28; H04K 3/45; H04K 3/65; H04K 2203/16; H04L 63/1441
USPC ............................................. 455/410
See application file for complete search history.

(56) References Cited

U.S. PATENT DOCUMENTS

| | | | | |
|---|---|---|---|---|
| 9,264,893 | B2* | 2/2016 | Jung | H04W 12/102 |
| 9,628,993 | B2* | 4/2017 | Liu | H04W 12/12 |
| 9,867,039 | B2* | 1/2018 | Wang | H04W 12/122 |
| 11,228,919 | B2* | 1/2022 | Jeon | H04W 24/10 |
| 11,368,846 | B2* | 6/2022 | Tsai | H04W 12/63 |
| 11,375,377 | B2* | 6/2022 | Xu | H04W 12/122 |
| 11,496,896 | B2* | 11/2022 | Kunz | H04W 12/009 |
| 11,516,765 | B2* | 11/2022 | Agarwal | H04W 12/122 |
| 11,800,362 | B2* | 10/2023 | Agarwal | H04W 12/61 |
| 11,895,490 | B2* | 2/2024 | Kolekar | H04W 12/69 |
| 11,985,552 | B2* | 5/2024 | Kolekar | H04W 36/08 |
| 11,991,521 | B2* | 5/2024 | Hessler | H04L 41/0893 |
| 12,096,222 | B2* | 9/2024 | Xu | H04W 12/122 |
| 2004/0046027 | A1 | 3/2004 | Leone et al. | |
| 2007/0058598 | A1 | 3/2007 | Ling | |
| 2007/0079376 | A1 | 4/2007 | Robert et al. | |
| 2007/0153696 | A1* | 7/2007 | Choyi | H04L 63/0263 370/235 |
| 2007/0165571 | A1 | 7/2007 | Nyu | |
| 2009/0044025 | A1 | 2/2009 | She | |
| 2014/0206279 | A1 | 7/2014 | Immendorf et al. | |
| 2015/0230157 | A1 | 8/2015 | Rattner et al. | |
| 2015/0271194 | A1 | 9/2015 | Szucs et al. | |
| 2016/0381545 | A1 | 12/2016 | Wang et al. | |
| 2017/0311165 | A1 | 10/2017 | Kang et al. | |
| 2018/0070228 | A1 | 3/2018 | Goldfarb | |
| 2018/0070239 | A1 | 3/2018 | Norrman et al. | |
| 2018/0192293 | A1 | 7/2018 | Bai et al. | |
| 2018/0262911 | A1 | 9/2018 | Han et al. | |
| 2019/0059032 | A1 | 2/2019 | Han et al. | |
| 2019/0110205 | A1 | 4/2019 | Shaik et al. | |
| 2019/0349765 | A1* | 11/2019 | Kolekar | H04W 12/068 |
| 2021/0014689 | A1 | 1/2021 | Wang | |
| 2021/0067972 | A1* | 3/2021 | Mcgrath | H04W 4/90 |
| 2022/0014920 | A1* | 1/2022 | Pham Van | H04W 4/20 |
| 2022/0014921 | A1* | 1/2022 | Da Silva | H04L 9/3242 |
| 2023/0007623 | A1* | 1/2023 | Da Silva | H04W 24/08 |
| 2023/0072998 | A1* | 3/2023 | Ohlsson | H04W 52/0219 |

FOREIGN PATENT DOCUMENTS

| | | |
|---|---|---|
| KR | 10-2008-0108806 A | 12/2008 |
| KR | 10-2017-0121517 A | 11/2017 |
| KR | 10-2019-0019812 A | 2/2019 |

OTHER PUBLICATIONS

Communication dated Jun. 3, 2021, issued by the International Searching Authority in counterpart International Application No. PCT/KR2021/002305 (PCT/ISA/237).
Office Action dated Oct. 21, 2024, issued by Korean Patent Office in Korean Patent Application No. 10-2020-0022707.
Communication dated Jun. 28, 2023, issued by the European Patent Office in counterpart European Application No. 21760465.1.

* cited by examiner

METHOD, MANAGEMENT SERVER, AND BASE STATION FOR DEFENDING ATTACK FROM FAKE BASE STATION IN COMMUNICATION NETWORK

CROSS-REFERENCE TO RELATED APPLICATION(S)

This application is a continuation application, claiming priority as a bypass application of International Application No. PCT/KR2021/002305, filed on Feb. 24, 2021, which is based on and claims the benefit of Korean Patent Application No. 10-2020-0022707, filed on Feb. 25, 2020 in the Korean Intellectual Property Office. The disclosures of both applications are incorporated by reference herein in their entirety.

BACKGROUND

1. Field

Various embodiments of the disclosure relate to a method, a management server, and a base station for defending against an attack from a fake base station in a communication network.

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a "beyond 4G network" communication system or a "post LTE" system.

The 5G communication system is considered to be implemented in mmWave bands (e.g., 6 to 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, and large scale antenna system (LSAS) techniques are discussed in 5G communication systems.

SUMMARY

A wireless communication network may include a wireless communication section in which a user equipment (UE) and a base station perform communication. When a fake base station (FBS), which is generated by copying a normal base station, is installed in the wireless communication section by a malicious attacker or other unauthorized party, serious problems such as tracking a user's location, wiretapping, sending a fake message, installing malware, and the like through the fake base station may occur.

Various embodiments may provide a method, a management server, and a base station for defending against an attack from a fake base station in a communication network, by collecting information of a neighboring base station from a normal base station and determining whether it is a fake base station, based on the collected information.

Various embodiments may provide a method, a management server, and a base station for defending against an attack from a fake base station in a communication network, by detecting a fake base station based on neighboring base station information collected from a normal base station and causing radio resources of the detected fake base station to be exhausted.

According to various embodiments, a base station may include an antenna; a memory; and a processor. The processor may be configured to analyze a signal received through the antenna to thereby determine if a source of the received signal is a fake base station. The processor may also be configured, based on a determination that the source of the received signal is the fake base station, to generate a random access preamble signal for accessing the fake base station, the random access preamble signal being based on the received signal. The processor may also be configured to transmit the generated random access preamble signal through the antenna.

According to various embodiments, a management server may include a communication interface; and a processor. The processor may be configured to receive, through the communication interface, base station-related information transmitted from at least one base station or at least one electronic device. The processor may also be configured to determine whether the received base station-related information corresponds to information on a fake base station. The processor may also be configured, based on a determination that the received based station-related information corresponds to the information on the fake base station, to select at least one normal base station as a base station for performing a defense mode against the fake base station. The processor may also be configured to transmit identification information for the fake base station to the selected at least one normal base station through the communication interface.

According to various embodiments, a method for defending against an attack from a fake base station in a communication network may include, on a processor of a base station, analyzing a signal received to thereby determine if a source of the received signal is a fake base station. The method may also include, based on a determination that the source of the received signal is the fake base station, on a processor of a base station, generating a random access preamble signal for accessing the fake base station, the random access preamble signal being based on the received signal. The method may also include transmitting the generated random access preamble signal through an antenna.

According to various embodiments, a method for defending against an attack from a fake base station in a communication network may include receiving, through a communication interface, base station-related information transmitted from at least one base station or at least one electronic device. The method may also include determining, on a processor, whether the received base station-related information corresponds to information on a fake base station. The method may also include, based on a determination that the received based station-related information corresponds to the information on the fake base station, selecting at least one normal base station as a base station for performing a defense mode against the fake base station. The method may also include transmitting identification information for the fake base station to the selected at least one normal base station through the communication interface.

Additional aspects will be set forth in part in the description which follows and, in part, will be apparent from the description, or may be learned by practice of the presented embodiments.

According to various embodiments, a normal base station may effectively defend against an attack from a fake base station by detecting the fake base station based on collected information of a neighboring base station and causing radio resources of the detected fake base station to be exhausted.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
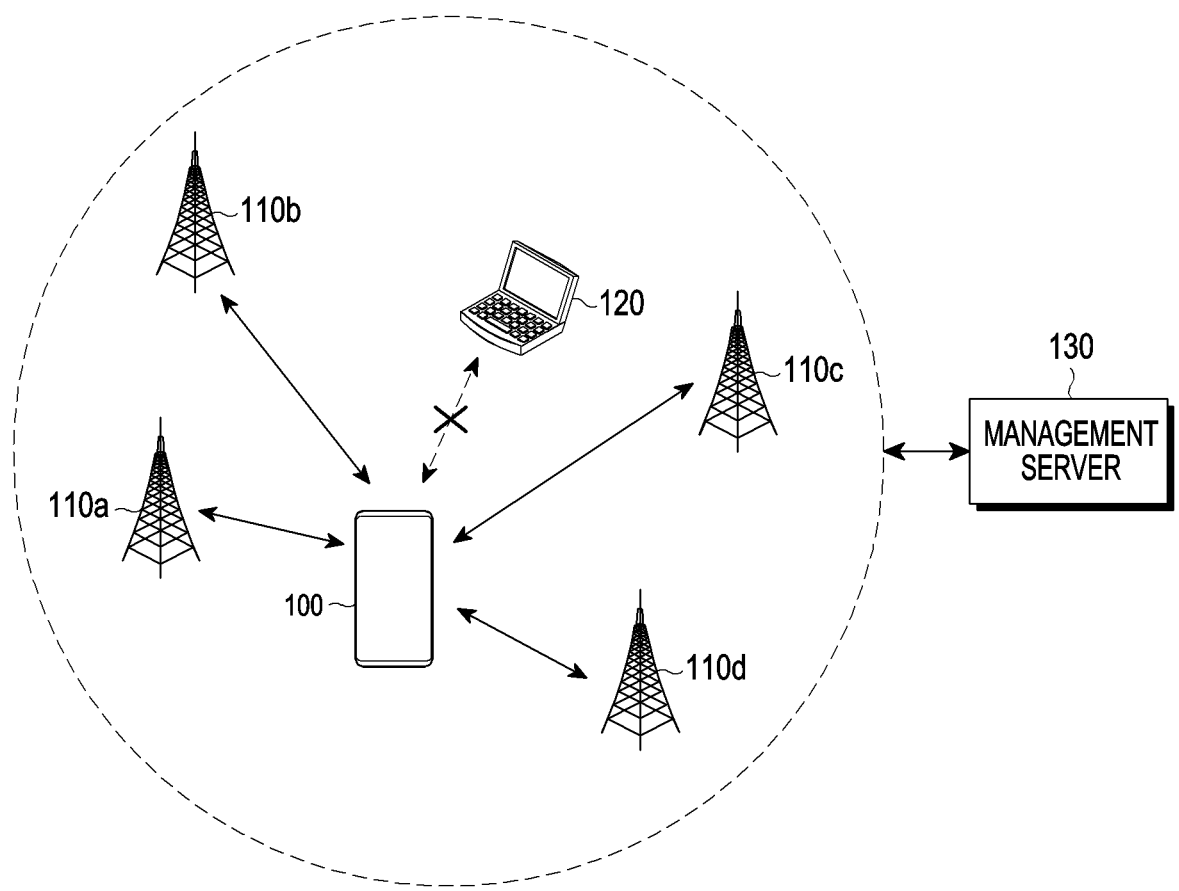
FIG. 1 illustrates a communication network environment according to various embodiments.

Hereinafter, exemplary embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Further, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Further, when the technical terms used herein are wrong technical terms that cannot correctly represent the idea of the disclosure, it should be appreciated that they are replaced by technical terms correctly understood by those skilled in the art. Further, the general terms used herein should be interpreted as defined in dictionaries or interpreted in the context of the relevant part, and should not be interpreted to have excessively restricted meanings.

In addition, a singular expression used herein may include a plural expression unless they are definitely different in the context. As used herein, such an expression as "comprises" or "include" should not be interpreted to necessarily include all elements or all steps described in the specification, and should be interpreted to be allowed to exclude some of them or further include additional elements or steps.

Further, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

When an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, exemplary embodiments of the disclosure will be described in detail with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Further, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

FIG. 1 illustrates a communication network environment according to various embodiments. Referring to FIG. 1, a system according to an embodiment of the disclosure may be applied to any communication system in which a terminal and a base station perform communication (e.g., 2G, 3G (e.g., wideband code division multiple access (WCDMA)), 4G (e.g., long-term evolution (LTE)), 5G, etc.), and may include an electronic device 100, a normal base station 110 (e.g., 110a, 110b, 110c, and 110d), a fake base station 120, and a management server 130.

The electronic device 100 may use a wireless communication network service by wirelessly accessing a normal base station 110. A malicious attacker may generate a fake base station 120 by mimicking a normal base station 110, and when the electronic device 100 mistakes the fake base station 120 for a normal base station 110 and accesses the same, problems such as tracking a user's location, wiretapping, sending a fake message, installing malware, and the like may occur.

According to various embodiments, the electronic device 100 or the normal base station 110 may collect pieces of information of adjacent base stations including the fake base station 120, and transmit the collected information to a management server 130. The management server 130 may detect the fake base station 120 by analyzing information received from the electronic device 100 and/or one or more of the normal base stations 110. According to various embodiments, the management server 130 may select a defense base station for defending against an attack from the fake base station 120, among normal base stations 110, in order to neutralize the detected fake base station 120. The management server 130 may transmit information on the detected fake base station 120 to the normal base station 110 selected as the defense base station.

According to various embodiments, the normal base station 110 selected as the defense base station may receive information on a fake base station 120 from the management server 130, and may operate in a defense mode in order to neutralize an attack from the fake base station 120. Various embodiments of detailed methods for neutralizing the fake base station 120 by the normal base station 110 and the management server 130 will be described later.

The management server 130 may collect information on adjacent base stations from the electronic device 100 or the normal base station 110 so as to determine the fake base station 120, and may select a defense base station for neutralizing the detected fake base station 120. The management server 130 may provide information on the fake base station 120 to the selected defense base station. According to various embodiments, the management server 130 may be implemented by being included in the form of software (S/W) or hardware (H/W) in the normal base station 110, may be implemented in the form of mobile edge computing (MEC), or may be configured in the form of a separate independent server.

The management server 130 may include at least one module for performing the operation. The module included in the management server 130 may be a virtualization module installed in the form of a software module. According to various embodiments, the management server 130 may be a server, which is configured separately for functions related to detection of a fake base station and selection of a defense base station, which will be described later, and may be a server in which functions to be described later are included in a server for other purposes or a general-purpose server.

Figure 2:
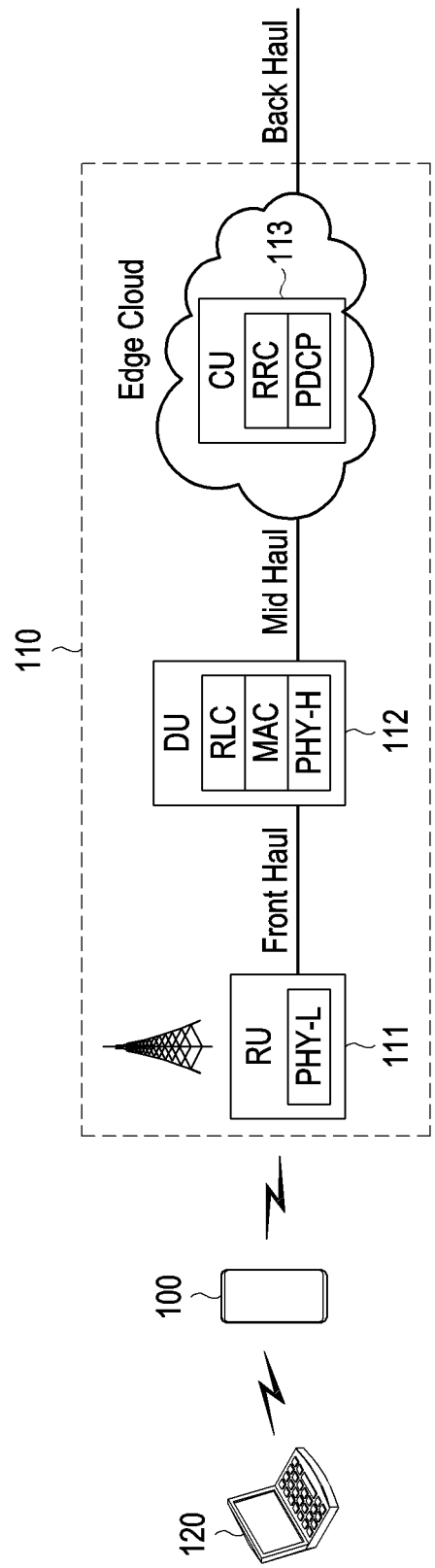
FIG. 2 illustrates a connection relationship of a communication network system according to various embodiments.

FIG. 2 illustrates a connection relationship of a communication network system according to various embodiments. FIG. 2 illustrates the configuration of a radio access network system according to an embodiment of the disclosure. Referring to FIG. 2, a base station 110 of a radio access network (RAN) system according to various embodiments may include at least one of a device including a function of a radio unit (RU) 111, a device including a function of a digital unit (DU) 112, and a device including a function of a central/cloud unit (CU) 113. The RU 111 may communicate with the electronic device 100 (e.g., a user equipment) through a wireless space. The electronic device 100 may be referred to as a terminal device (terminal), a mobile equipment (ME), a user equipment (UE), a user terminal (UT), a subscriber station (SS), a wireless device, a handheld device, and an access terminal (AT). In addition, the electronic device 100 may be a device having a function of communication, such as a mobile phone, a personal digital assistant (PDA), a smartphone, a wireless modem, a notebook computer, and the like.

The RU 111 may perform processing corresponding to a lower physical layer (PHY-L) with regard to transmitted or received wireless communication data. The processing corresponding to the lower physical layer may include at least one processing of channel coding, antenna mapping, and data modulation. The RU 111 may include a radio frequency (RF) module or an inter frequency (IF) module, and may convert the lower physical layer-processed data from a digital signal to an analog signal using a digital to analog converter (DAC) and then convert the same into an IF signal or an RF signal. The data converted into the RF signal may be transmitted to a wireless space through an antenna.

A DU 112 may communicate with the RU 111 by wire through a transport network. A link between the RU 111 and the DU 112 may be referred to as a front haul. The DU 112 may receive lower physical layer-processed data from the RU 111 and perform higher physical layer (PHY-H) processing thereof. The higher physical layer processing may be defined in various manners, and may include processing such as forward error correcting (FEC), symbol mapping, or the like. The DU 112 may perform media access control (MAC) layer processing and a radio link control (RLC) layer processing for the higher physical layer-processed data.

A CU 113 may communicate with the DU 112 by wire through a transport network. A link between the DU 112 and the CU 113 may be referred to as a mid-haul. The CU 113 may receive RLC layer-processed data from the DU 112 and perform packet data convergence protocol (PDCP) layer processing and radio resource control (RRC) layer processing thereon.

According to various embodiments, processing corresponding to a wireless communication protocol layer processed in the DU 112 or the CU 113 may be configured in the form of a virtualized software module (e.g., a VNF module) which is dynamic and generally executable on an electronic device (or server) having a general-purpose processor.

According to various embodiments, the DU 112 or the CU 113 may include at least one module for collecting information of an adjacent base station or operating in a defense mode. The CU 113 may communicate with the management server 130 through a transport network referred to as a back haul. According to various embodiments, the management server 130 may be implemented by being included in the CU 113.

Figure 3A:
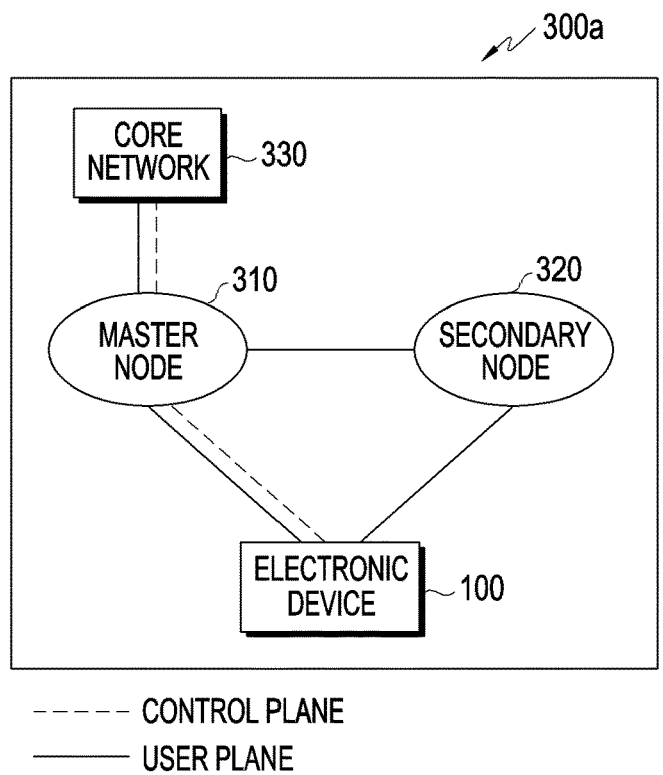
FIG. 3A, FIG. 3B, and FIG. 3C illustrate a wireless communication system for providing a network of legacy communication and/or 5G communication according to various embodiments.
Figure 3B:
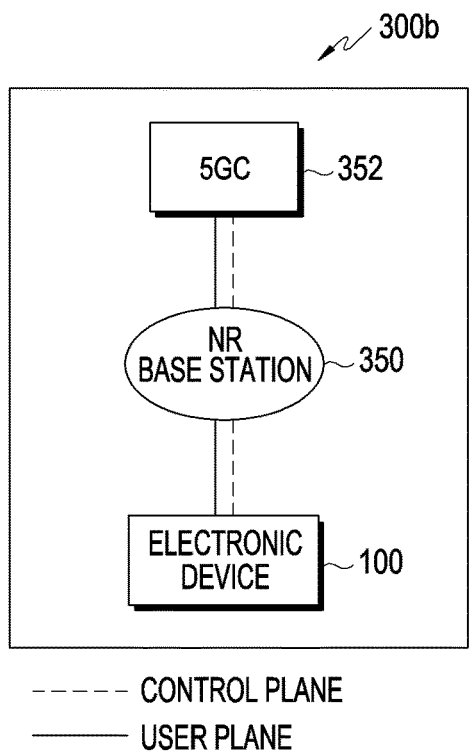
Figure 3C:
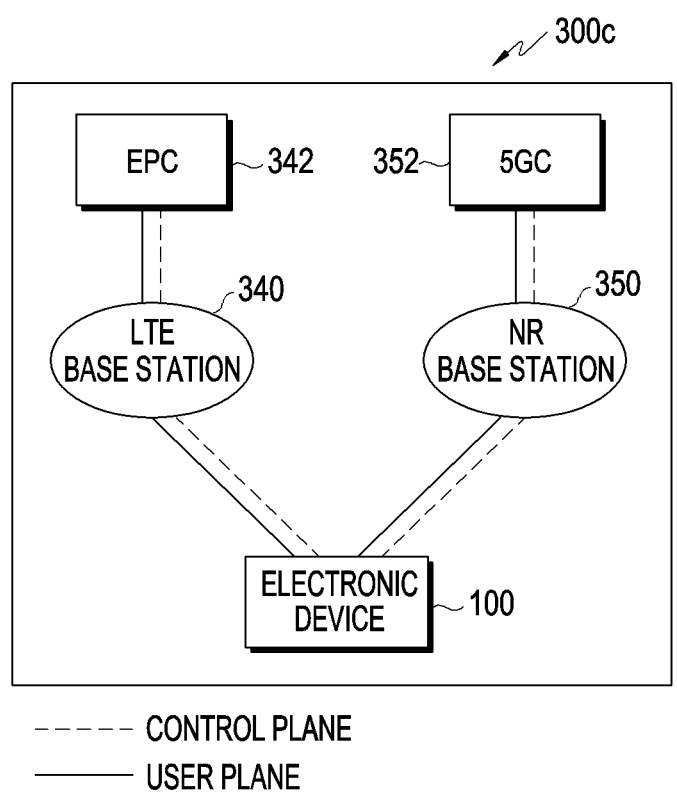

FIG. 3A, FIG. 3B, and FIG. 3C illustrate a wireless communication system for providing a network of legacy communication and/or 5G communication according to various embodiments. Referring to FIG. 3A to FIG. 3C, network environments 300a to 300c may include at least one of a legacy network and a 5G network. The legacy network may include, for example, a 4G or LTE base station 340 (for example, eNodeB (eNB)) (e.g., the normal base station 110 of FIG. 1) of the 3GPP standard for supporting wireless access to the electronic device 100, and an evolved packet core (EPC) 342 for managing 4G communication. The 5G network may include, for example, a new radio (NR) base station 350 (for example, gNodeB (gNB)) (e.g., the normal base station 110 of FIG. 1) for supporting wireless access to the electronic device 100, and a 5th generation core (5GC) 352 for managing 5G communication of the electronic device 100.

According to various embodiments, the electronic device 100 may transmit or receive a control message and user data through legacy communication and/or 5G communication. The control message may include, for example, a message related to at least one of security control, bearer setup, authentication, registration, or mobility management of the electronic device 100. The user data may refer to, for example, user data except for a control message transmitted or received between the electronic device 100 and a core network 330 (for example, the EPC 342).

Referring to FIG. 3A, the electronic device 100 according to an embodiment may transmit or receive at least one of the control message and user data to or from at least a part of a 5G network (e.g., the NR base station 350 or the 5GC 352), by using at least a part of a legacy network (e.g., the LTE base station 340 or the EPC 342).

According to various embodiments, a network environment 300a may include a network environment in which wireless communication dual connectivity (DC) to the LTE base station 340 and NR base station 350 is provided, and a control message is transmitted or received to or from the electronic device 100 through a core network 230 of one of the EPC 342 and the 5GC 352.

According to various embodiments, in a DC environment, one base station among the LTE base station 340 and the NR base station 350 may operate as a master node (MN) 310 and the other base station may operate as a secondary node (SN) 320. The MN 310 may be connected to the core network 330 so as to transmit or receive a control message. The MN 310 and the SN 320 may be connected through a network interface so as to transmit or receive a message related to management of a radio resource (for example, a communication channel) to or from each other.

According to various embodiments, the MN 310 may be configured by the LTE base station 340, the SN 320 may be configured by the NR base station 350, and the core network 330 may be configured by the EPC 342. For example, a control message may be transmitted or received through the LTE base station 340 and the EPC 342, and user data may be transmitted or received through at least one of the LTE base station 340 and the NR base station 350.

According to various embodiments, the MN 310 may be configured by the NR base station 350, the SN 320 may be configured by the LTE base station 340, and the core network 330 may be configured by the 5GC 352. For example, a control message may be transmitted or received through the NR base station 350 and the 5GC 352, and user data may be transmitted or received through at least one of the LTE base station 340 and the NR base station 350.

Referring to FIG. 3B, according to various embodiments, a 5G network may be configured by the NR base station 350 and the 5GC 352, and may independently transmit or receive a control message and user data to or from the electronic device 100.

Referring to FIG. 3C, a legacy network and a 5G network according to various embodiments may each independently provide data transmission or reception. For example, the electronic device 100 and the EPC 342 may transmit/receive a control message and user data to/from each other through the LTE base station 340. As another example, the electronic device 100 and the 5GC 352 may transmit/receive a control message and user data to/from each other through an NR base station 350.

According to various embodiments, the electronic device 100 may be registered in at least one of the EPC 342 and the 5GC 352 so as to transmit or receive a control message.

According to various embodiments, the EPC 342 or the 5GC 352 may interwork so as to manage communication of the electronic device 100. For example, movement information of the electronic device 100 may be transmitted or received through an interface between the EPC 342 and the 5GC 352.

As described above, dual connectivity through the LTE base station 340 and the NR base station 350 may be referred to as E-UTRA new radio dual connectivity (EN-DC).

Figure 4:
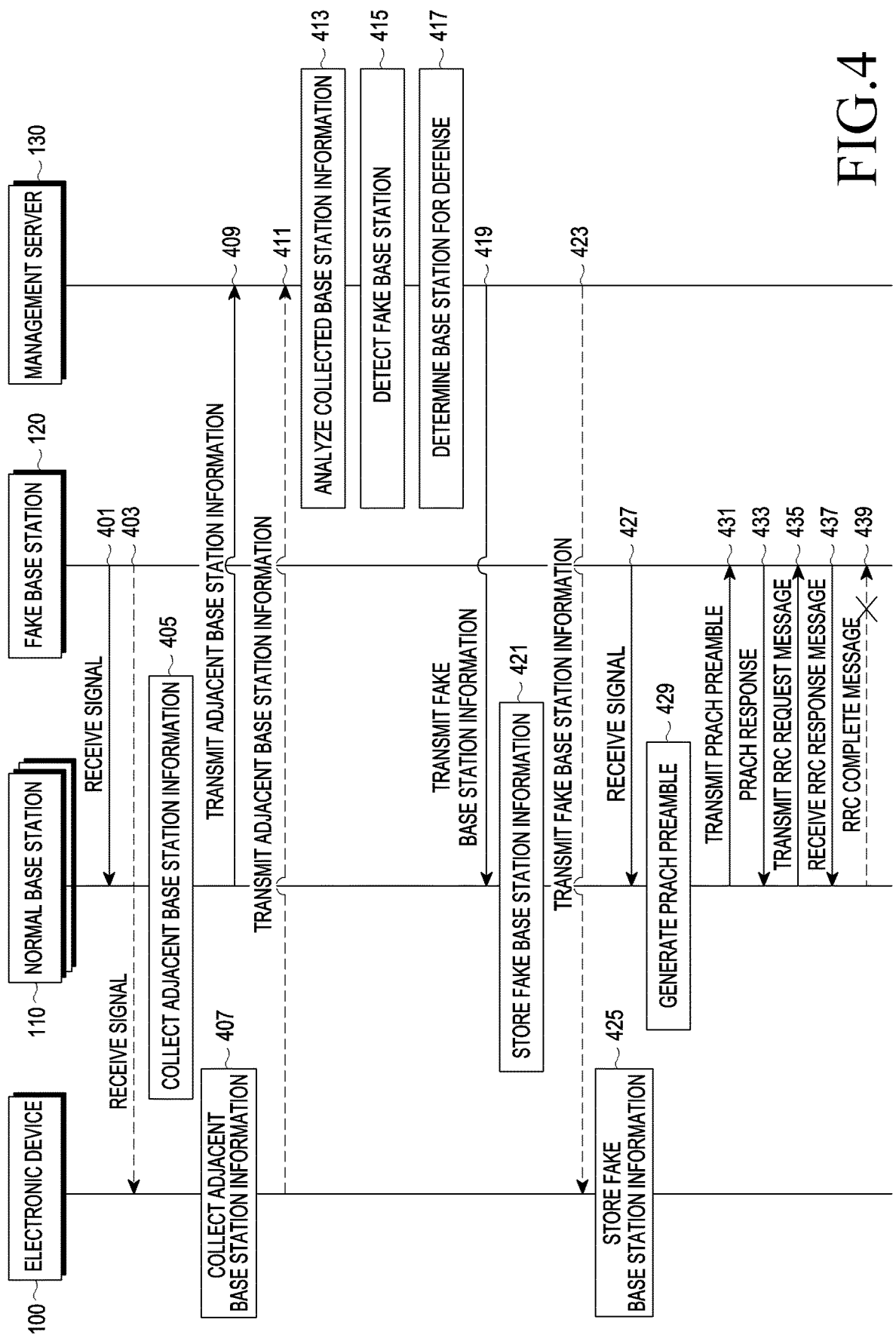
FIG. 4 is a signal flow diagram illustrating an operation method between devices according to various embodiments.

FIG. 4 is a signal flow diagram illustrating an operation method between devices according to various embodiments. Referring to FIG. 4, a normal base station 110 may operate as a base station by communicating with the electronic device 100 (e.g., user equipment (UE)). According to various embodiments, the normal base station 110 may operate as a user equipment for adjacent base stations by including at least some of the functions of the electronic device 100. As the normal base station 110 operates as the user equipment, the normal base station 110 may receive a signal transmitted from at least one base station adjacent to the normal base station 110. According to various embodiments, when at least one fake base station (BS) 120 exists in a location adjacent to the normal base station 110, the normal base station 110 may receive a signal transmitted from the fake base station 120 in operation 401.

According to various embodiments, a signal, which is received from the normal base station 110, is a signal transmitted from at least one adjacent base station (for example, an adjacent normal base station) including the fake base station 120, and may include at least one piece of information used for a cell search. For example, the signal received from the normal base station 110 may include a signal for acquiring synchronization with an adjacent base station (or cell) (for example, a primary synchronization signal (PSS), or a secondary synchronization signal (SSS)) or system information (for example, a master information block (MIB), or a system information block (SIB)). According to various embodiments, the normal base station 110 may obtain, based on the PSS and/or SSS received from an adjacent base station including the fake base station 120, frequency synchronization, symbol synchronization, or frame synchronization for communication with the corresponding base station. According to various embodiments, the normal base station 110 may obtain, based on the PSS and/or SSS received from an adjacent base station including the fake base station 120, cell identification information (cell ID) (for example, a physical cell ID) on the base station having transmitted the corresponding signal. According to various embodiments, the normal base station 110 may identify system information received from an adjacent base station, based on a PSS and/or an SSS received from the adjacent base station including the fake base station 120.

For example, the MIB among the identified system information may include at least one of information on downlink cell bandwidth, information on a physical hybrid-ARQ indicator channel (PHICH) configuration of a cell, and a system frame number (SFN). Further, the SIB among the identified system information may include at least one of service provider information of the corresponding cell, configuration information of UL/DL subframe allocation, scheduling information of the SIB, information required for a terminal to access a cell (for example, information on uplink cell bandwidth, a random access parameter, a parameter related to uplink power control), and cell reselection related information.

According to various embodiments, the electronic device 100 may receive a signal transmitted from at least one base station adjacent to the electronic device 100, in a similar manner as the operation of the normal base station 110 described above. According to various embodiments, when at least one fake base station 120 exists in a location adjacent to the electronic device 100, the electronic device 100 may receive a signal transmitted from the fake base station 120 in operation 403.

According to various embodiments, like the normal base station 110, the electronic device 100 may identify at least one piece of information used for cell search from a signal transmitted from at least one adjacent base station including the fake base station 120. According to various embodiments, the electronic device 100 may obtain, based on the PSS and/or SSS received from an adjacent base station including the fake base station 120, frequency synchronization, symbol synchronization, or frame synchronization for communication with the corresponding base station. According to various embodiments, the electronic device 100 may obtain, based on the PSS and/or SSS received from an adjacent base station including the fake base station 120, cell identification information (cell ID) on the base station having transmitted the corresponding signal. According to various embodiments, the electronic device 100 may identify system information received from the adjacent base station based on the PSS and/or SSS received from an adjacent base station including the fake base station 120. For example, the identified system information may include the MIB or SIB.

According to various embodiments, in operation 405, the normal base station 110 may collect adjacent base station information based on information identified from an adjacent base station including the fake base station 120. For example, adjacent base station information collected by the normal base station 110 may include at least one of cell identification information (cell ID), base station configuration information (for example, channel information or capability information), received signal strength (RSS) of an adjacent base station (or a received signal strength indicator (RSSI)), location information of a base station, channel state information (CSI) information, operation-related information (for example, operation time information), and system information. According to various embodiments, in addition to the information listed above, various pieces of base station information, which can be collected according to a mobile communication standard (for example, a long-term evolution (LTE) standard or a new radio (NR) standard), may be collected, and various embodiments are not limited to the above pieces of information. In operation 409, the adjacent base station information collected by the normal base station 110 may be transmitted to the management server 130. According to various embodiments, the normal base station 110 may generate new adjacent base station information based on information collected by the adjacent base station, and the adjacent base station information generated by the normal base station 110 may be transmitted to the management server 130. For example, the normal base station 110 may estimate the location of a corresponding base station based on an RSS (or RSSI) of a signal received from an adjacent base station. The normal base station 110 may include the information on the estimated location in the adjacent base station information and transmit the same to the management server 130.

According to various embodiments, the electronic device 100 may, like the normal base station 110, collect adjacent base station information based on information identified from the adjacent base station in operation 407. In operation 411, the adjacent base station information collected by the electronic device 100 may be transmitted to the management server 130. The adjacent base station information transmitted from the electronic device 100 to the management server 130 may be the same as or similar to the adjacent base station information transmitted from the normal base station 110 to the management server 130.

According to various embodiments, the adjacent base station information, which is transmitted from the normal base station 110 or the electronic device 100 to the management server 130, may be mapped with base station identification information corresponding to each piece of adjacent base station information and transmitted therewith. The base station identification information may be specific cell identification information (cell ID), or identification information newly allocated to classify the adjacent base station information according to each base station. According to various embodiments, the base station identification information may be used to identify a fake base station when a physical random access channel (PRACH) preamble or an RRC request message is to be transmitted from a defense base station to the fake base station as described in operation 429 and thereafter, which will be described later.

According to various embodiments, the management server 130 may analyze at least one piece of adjacent base station information received from the normal base station 110 or the electronic device 100 in operation 413. The management server 130 may compare the analyzed adjacent base station information with pre-stored base station-related information (for example, information on a normal base station) so as to determine whether each piece of adjacent base station information corresponds to a fake base station rather than a normal base station, to thereby detect a fake base station in operation 415.

More specifically, the adjacent base station information, which is received from the normal base station 110 or the electronic device 100 by the management server 130 may include at least one piece of cell identification information (cell ID), base station configuration information (for example, channel information or capability information), received signal strength (RSS) of an adjacent base station, location information of a base station, channel state information (CSI) information, operation-related information (for example, operation time information), and system information. The management server 130 may analyze the received adjacent base station information, and may compare the analyzed information with pre-stored base station-related information (for example, information on a normal base station), to thereby determine whether a base station corresponding to the corresponding adjacent base station information is a fake base station or a normal base station. Base station-related information stored in the management server 130 (for example, information on a normal base station) may be provided from a server of a communication service provider, and may include base station installation information (for example, information on location in which a base station is installed, cell identification information, base station configuration information, and base station operating information).

According to various embodiments, the management server 130 may compare the corresponding adjacent base station location information included in the adjacent base station information with the pre-stored normal base station location information, and when the two pieces of location information differ by a configured distance or more as a result of the comparison, may determine a base station corresponding to the corresponding adjacent base station information as a fake base station. As another method, the management server 130 may estimate location information of the corresponding adjacent base station from the RSS or CSI information included in the adjacent base station information and compare the estimated location information with the pre-stored normal base station location information, to thereby determine that, when the two pieces of location information differ by a configured distance or more, a base station corresponding to the corresponding adjacent base station information is a fake base station.

According to various embodiments, the management server 130 may identify antenna fingerprint information from CSI information for a corresponding adjacent base station, included in the adjacent base station information, and may compare the identified antenna fingerprint information with pre-stored antenna fingerprint information of the normal base station, to thereby determine whether the adjacent base station is a fake base station.

According to various embodiments, the management server 130 may identify operating information (for example, operating information for each time zone) on a corresponding adjacent base station, included in the adjacent base station information, and may compare the identified operating information with pre-stored operating information of the normal base station, to thereby determine whether the adjacent base station is a fake base station.

According to various embodiments, the management server 130 may identify configuration information (for example, channel information or capability information) for a corresponding adjacent base station, included in the adjacent base station information, and compare the identified configuration information with pre-stored configuration information of the normal base station, to thereby determine whether the adjacent base station is a fake base station.

According to various embodiments, the management server 130 may compare multiple items (for example, location information, antenna fingerprint information, operating information, and configuration information) analyzed from the received adjacent base station information with the pre-stored information of the normal base station, and when a specific condition is satisfied (for example, when as a result of the comparison, a difference between the pre-stored information and the analyzed information is greater than or equal to a configured threshold), may determine the corresponding adjacent base station as a fake base station. A detailed description of various embodiments in which the management server 130 determines a fake base station will be described later in the description of FIG. 12.

According to various embodiments, the management server 130 may select at least one base station (hereinafter, referred to as a 'defense base station' for convenience of explanation) to perform a defense operation against the determined (or detected) fake base station in operation 417. A method of determining a base station to be suitable for selection as the defense base station may be implemented using various methods. For example, a normal base station 110 belonging within a predetermined distance from a location, which is estimated with respect to the fake base station 120, may be selected as a defense base station.

According to various embodiments, a communication service provider may group multiple base stations to belong to one tracking area (TA) and manage the same when configuring a communication network. The management server 130 may configure at least one base station in a tracking area corresponding to a location, which is estimated with respect to the fake base station 120, as a defense base station against the corresponding fake base station 120. Various embodiments of a method of determining a base station to be suitable for selection as the defense base station and a method of determining a number of defense base stations will be described later in the description of FIG. 5.

According to various embodiments, the management server 130 may transmit the fake base station information to the selected defense base station in operation 419. Hereinafter, for convenience of explanation, it is assumed that the normal base station 110 is selected as a defense base station. The normal base station 110 selected as the defense base station may store the fake base station information, which is received from the management server 130, in a memory in operation 421. The fake base station information transmitted from the management server 130 to the defense base station (for example, the normal base station 110) may include base station identification information (for example, cell identification information or identification information newly allocated when the normal base station 110 collects each piece of adjacent base station information) for identifying a fake base station or base station location information. According to various embodiments, the management server 130 may further transmit, together with the fake base station information, PRACH index information for performing a defense operation and a seed value for generating an international mobile station identity (IMSI). According to various embodiments, the PRACH index information may be used for multiple defense base stations to transmit different sequences of PRACH preambles during transmission of the PRACH preambles to a specific fake base station. The seed value for generating the IMSI may be used for the base station to perform processing as if, when multiple defense base stations transmit an RRC request message to a specific fake base station, the RRC request message has been transmitted from different terminals.

According to various embodiments, the electronic device 100 may receive the fake base station information from the management server 130 in operation 423, like the normal base station 110, and may store the received fake base station information in a memory in operation 425. According to various embodiments, the electronic device 100 may control to register the fake base station information, stored in the memory, in a black-list so as not to perform a connection to the corresponding fake base station.

According to various embodiments, the normal base station 110 determined as the defense base station may operate as a function of a terminal to thereby receive signals from adjacent base stations including the fake base station 120 in operation 427. According to various embodiments, the signal received from the normal base station 110 corresponds to the signal transmitted from at least one adjacent base station including the fake base station 120, and may include at least one piece of information used for cell search. According to various embodiments, the normal base station 110 may obtain, based on the PSS and/or SSS received from an adjacent base station including the fake base station 120, frequency synchronization, symbol synchronization, or frame synchronization for communication with the corresponding base station. According to various embodiments, the normal base station 110 may obtain, based on the PSS and/or SSS received from an adjacent base station including the fake base station 120, cell identification information (cell ID) on the base station having transmitted the corresponding signal. According to various embodiments, the normal base station 110 may identify system information received from the adjacent base station based on the PSS and/or SSS received from an adjacent base station including the fake base station 120. For example, the identified system information may include the MIB or SIB.

The normal base station 110 may compare a signal received from a fake base station 120 among the adjacent base stations with the fake base station information received from the management server 130 and identify that the corresponding signal is a signal transmitted from the fake base station 120.

More specifically, the normal base station 110 may identify cell identification information (cell ID) from a signal transmitted from a specific base station, and may determine the specific base station as a fake base station when the identified cell identification information corresponds to the fake base station cell identification information received from the management server 130. According to another embodiment, the normal base station 110 may determine location information of a corresponding base station based on a signal transmitted from a specific base station (for example, based on RSS information), and when the identified location information corresponds to the fake base station location information received from the management server 130, may determine the specific base station as a fake base station. The normal base station 110 may transmit a PRACH preamble or an RRC request message as described later, based on a signal transmitted from the specific base station determined as a fake base station.

According to another embodiment, the normal base station 110 may consider a random base station adjacent to the normal base station 110 as a fake base station, and may transmit a PRACH preamble or transmit an RRC request message as described later based on a signal transmitted from the corresponding base station. According to various embodiments, the normal base station 110 may transmit a PRACH preamble to the fake base station 120 at least based on a signal (for example, a PSS and/or an SSS) received from the detected fake base station 120. For example, the normal base station 110 may identify a PRACH parameter corresponding to the fake base station 120 from the MIB or SIB information received from the detected fake base station 120, and may transmit the PRACH preamble based on the identified PRACH parameter. According to various embodiments, the normal base station 110 may generate a preamble sequence according to the PRACH index information received from the management server 130 in operation 429, and may transmit the PRACH preamble based on the generated preamble sequence in operation 431.

According to various embodiments, in response to the PRACH preamble transmission, the normal base station 110 may receive a PRACH response from the fake base station 120 in operation 433. The normal base station 110 may, in response to receiving the PRACH response, generate and transmit an RRC request message in operation 435. According to various embodiments, the normal base station 110 may generate an IMSI based on the seed for IMSI generation, received from the management server 130, and may include the generated IMSI in the RRC request message and transmit the same. According to various embodiments, the normal base station 110 may repeatedly transmit the PRACH preamble and/or the RRC request message by a configured number of times for a configured period of time. The normal base station 110 may transmit different preamble sequences according to different PRACH index information when repeating transmission of the PRACH preamble. The normal base station 110 may transmit the RRC request message including different IMSIs generated based on different seeds, when repeating transmission of the RRC request message.

According to various embodiments, the PRACH preamble and/or the RRC request message may be transmitted simultaneously or sequentially from multiple defense base stations (e.g., the normal base station 110). The fake base station 120 receives PRACH preambles exceeding the configured number of PRACH channels (for example, 64) within a predetermined period of time, which may result in exhaustion of the configured PRACH channels, and thus the fake base station 120 may be unable to normally process PRACH preambles received thereafter. The fake base station 120 receives multiple RRC request messages within a predetermined period of time, which may result in exhaustion of all the RRC protocol queues, and thus the fake base station 120 may be unable to normally process a RRC request message received thereafter.

According to various embodiments, the normal base station 110 may receive an RRC response message from the fake base station 120 in operation 437, and although the RRC response message is normally received from the fake base station 120, the normal base station 110 may be unable to transmit an RRC complete message in operation 439. Although the RRC response message has been transmitted to the normal base station 110, the fake base station 120 may not normally receive the RRC complete message, and accordingly information on the corresponding normal base station 110 is continuously maintained in an RRC protocol queue so as not to perform additional RRC access to other devices.

Figure 5:
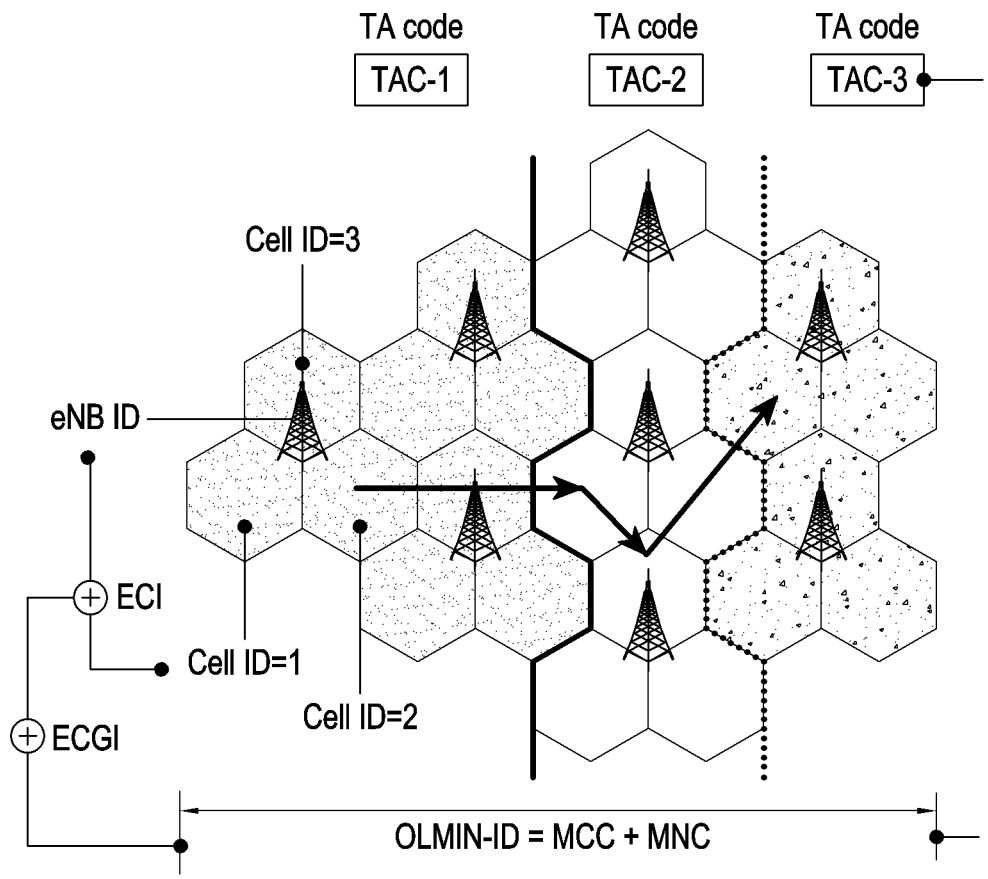
FIG. 5 illustrates a base station for performing a defense mode according to various embodiments.

FIG. 5 illustrates a base station for performing a defense mode according to various embodiments. Referring to FIG. 5, a 4G communication network or a 5G communication network may group multiple base stations (for example, normal base stations 110) to belong to one tracking area (TA) and manage the same.

One base station (for example, the normal base station 110) may have multiple cells (for example, three cells), and one TA may include multiple base stations. The TA may be used for paging a signal by tracking the location of the electronic device 100 (for example, a user equipment) or for handover between base stations (or cells). According to various embodiments, a communication service provider may group multiple adjacent base stations so as to configure the same as one TA. Each of the TAs may be classified by a TA code (TAC), and the TAC may be predetermined by a communication service provider at an initial stage of configuring a communication network. Each base station (for example, the normal base station 110) may be preconfigured as to which TA the base station itself belongs.

According to various embodiments, when selecting a defense base station for defending against a specific fake base station 120, the management server 130 may select one or more base stations adjacent to the fake base station 120 as a defense base station, and may configure a defense base station based on the configuration of the TA. For example, when selecting a defense base station for defending against a specific fake base station 120, if the number of defense base stations to be selected is smaller than the number of normal base stations 110 in a corresponding TA, the management server may select defense base stations from the normal base stations 110 in the corresponding TA. When the number of defense base stations to be determined is greater than the number of normal base stations 110 in the corresponding TA, the management server may additionally select one or more defense base station from the normal base stations 110 of an adjacent TA, as well as from those of the corresponding TA.

For example, when the management server 120 selects a base station for a defense operation, it may be implemented such that a TA to which a corresponding fake base station 130 belongs is identified from a core network (for example, a mobility management entity (MME)) and a defense operation is performed through a normal base station 110 or a vRAN connected to the corresponding TA.

Hereinafter, an embodiment for selecting a defense base station will be described. However, embodiments of this document are not limited thereto.

For example, a management server 130 may select a defense base station by the following algorithm based on TA information. Values used in an algorithm for selecting a defense base station may be defined as follows:

Participating: NULL
NumNeededBS (Number of required defense base stations)=(Number of RRC request messages per second required to exhaust RC queue)/(Number of RRC request messages that can be transmitted per second by one base station)
AvailableBS=Base station in a TA in which a fake base station is located
NumAvailableBS=AvailableBS.getNum( )/Number of base stations in a TA in which a fake base station is located An algorithm for selecting a suitable defense base station using the defined values may be configured as follows:

```
List getParticipatingBS( ) {
    if (NumAvailableBS > NumNeededBS) // If the number of
base stations in a TA is greater than the number of required defense
base stations, selection is made in a sequence of signal strength
        AvailableBS.sort(signal strength)
        ParticipatingBS = AvailableBS.get(0, NumNeededBS) // select
as many base stations as the number of required base stations
        return ParticipatingBS
    else // If the number of base stations in a TA is smaller than the
number of required defense base stations, add a base station of an adjacent
TA
        AvailableBS.add (Add a base station of another TA adjacent
to a corresponding TA)
        NumAvailableBS = AvailableBS.getNum( )
        getParticipatingBS( )
```

Referring to FIG. 5, Cell ID, eNB ID, PLMN-ID, and the like may be used as base station identification information for identifying a fake base station according to various embodiments. For example, when base station identification information obtained from a signal received from a base station within a specific TA is different from base station identification information preconfigured by a communication service provider, the base station that has transmitted the corresponding signal may be determined as a fake base station.

Figure 6:
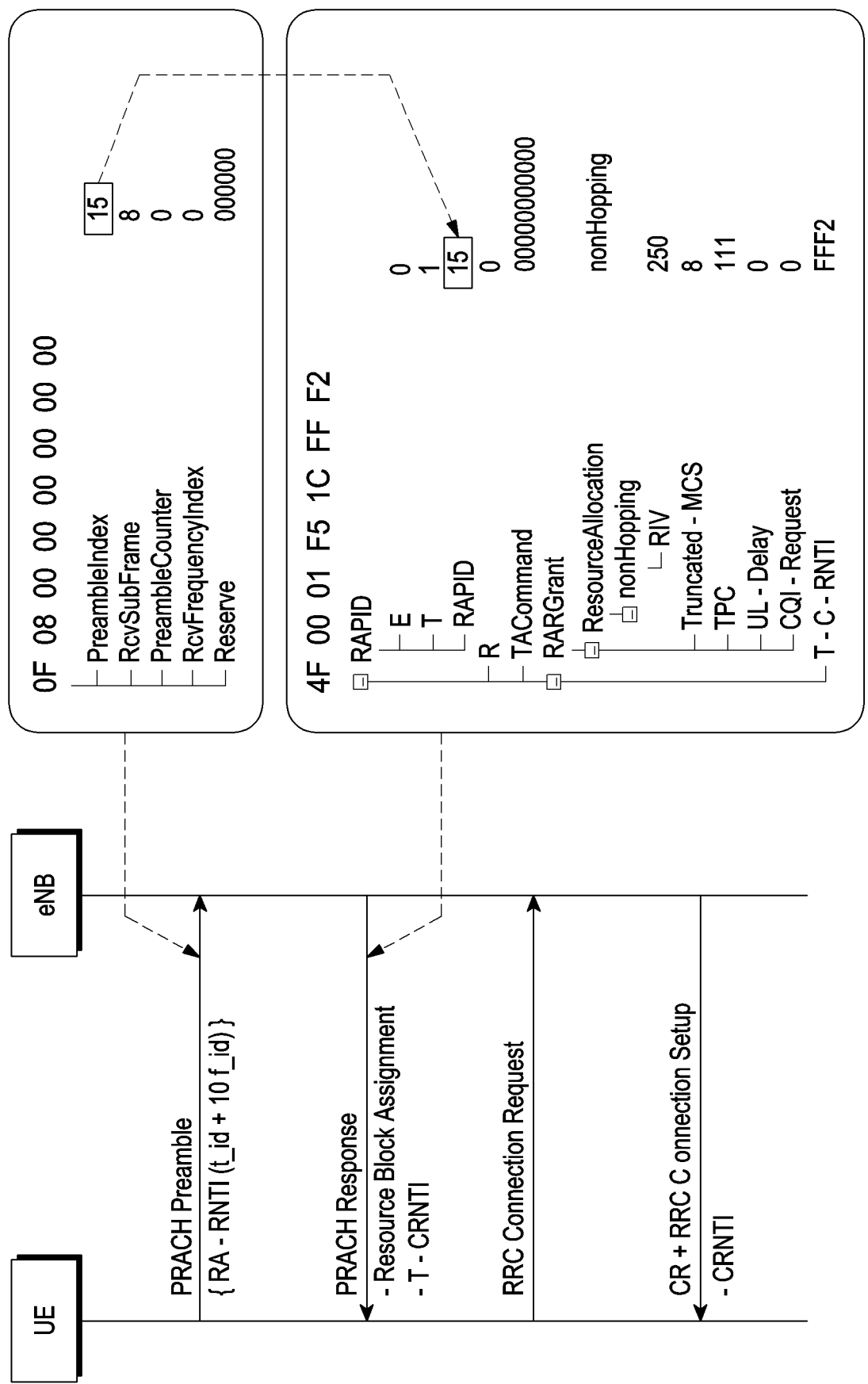
FIG. 6 is a flowchart illustrating a method for accessing between an electronic device and a base station according to various embodiments.

FIG. 6 is a flowchart illustrating an access method between an electronic device and a base station according to various embodiments. Referring to FIG. 6, when a physical random access channel (PRACH) preamble is transmitted from an electronic device (for example, UE) to a base station (for example, eNB), the base station may transmit a PRACH response message to the electronic device. As illustrated in FIG. 6, a random access preamble index may be included in the transmitted/received PRACH preamble and PRACH response message.

The random access preamble index may be configured by a specified number of bits (for example, 6 bits), and the number of PRACH preambles that can be processed by one base station may be limited. In various embodiments, as described before in FIG. 4, a defense base station may repeatedly transmit PRACH preambles having different random access preamble indices, which may be randomly generated or selected from a preconfigured set, to a fake base station, which may result in exhaustion of PRACH channels capable of being processed by the fake base station, and thus may be unable to perform normal processing of a PRACH preamble transmitted from another electronic device 100.

Figure 7:
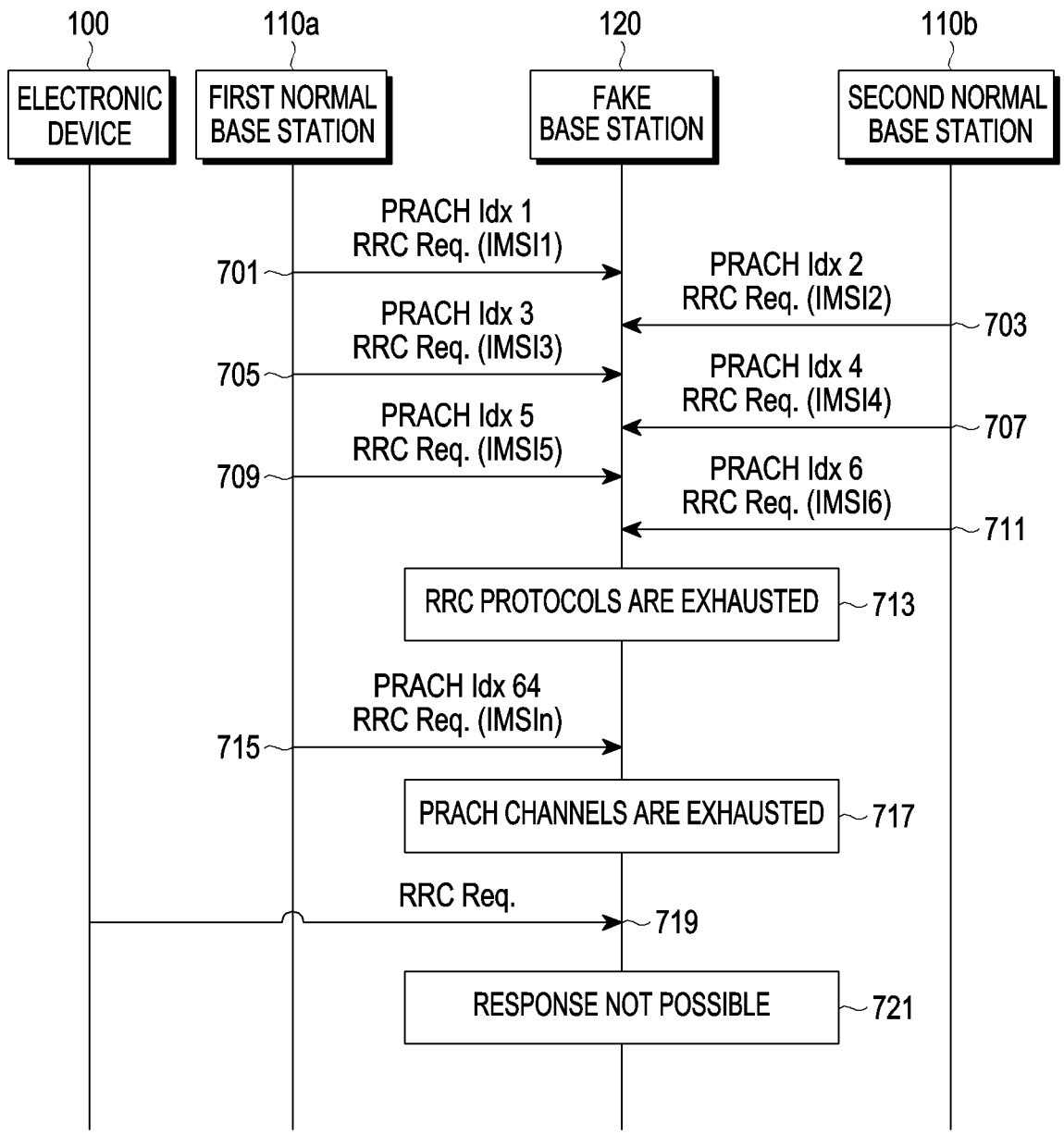
FIG. 7 is a signal flow diagram illustrating a method for accessing a fake base station by a normal base station according to various embodiments.

FIG. 7 is a signal flow diagram illustrating a method for accessing a fake base station by a normal base station according to various embodiments. Referring to FIG. 7, two normal base stations including a first normal base station 110*a* and a second normal base station 110*b* may be determined as defense base stations. The first normal base station 110*a* and the second normal base station 110*b* may be base stations belonging to the same TA as that of a fake base station 120.

When it is assumed that the number of PRACH channels usable in the fake base station 120 is 64 and the number of RRC protocol queues is 6, the first normal base station 110*a* and the second normal base station 110*b* may be allocated with different PRACH index information and IMSI values from a management server 130.

For example, the first normal base station 110*a* may transmit PRACH preambles having different index information, such as PRACH Idx 1, PRACH Idx 3, PRACH Idx 5, and the like (indicated by reference numerals 701, 705, and 709), to the fake base station 120. Similarly, the second normal base station 110*b* may transmit PRACH preambles having different index information, such as PRACH Idx 2, PRACH Idx 4, PRACH Idx 6, and the like (indicated by reference numerals 703, 707, and 711) to the fake base station 120. When normal base stations 110*a* and 110*b* repeatedly transmit a total of 64 PRACH preambles, each base station transmitting 32 PRACH preambles, to the fake base station 120, available PRACH channels of the fake base station 120 may all be exhausted, and unable to respond upon receipt of further PRACH preambles (indicated by reference numerals 715 and 717).

According to various embodiments, the first normal base station 110*a* may transmit each of the PRACH preambles and then transmit an RRC request message including IMSI1, IMSI3, and IMSI5, which are different IMSI values (messages again indicated by reference numerals 701, 705, and 709), to the fake base station 120. Similarly, the second normal base station 110*b* may transmit each of the PRACH preambles and then transmit an RRC request message including IMSI2, IMSI4, and IMSI6, which are different IMSI values (indicated by reference numerals 703, 707, and 711), to the fake base station 120. Although each of normal base station 110*a* and normal base station 110*b* repeatedly transmits a designated number of RRC request messages or more and receives an RRC response message from the fake base station 120, when there is no transmission of an RRC complete message, available RRC protocol queues of the fake base station 120 are all exhausted in operation 713. Therefore, even if the electronic device 100 transmits the RRC request message to the fake base station 120, the fake base station 120 cannot respond (indicated by reference numerals 719 and 721).

Figure 8A:
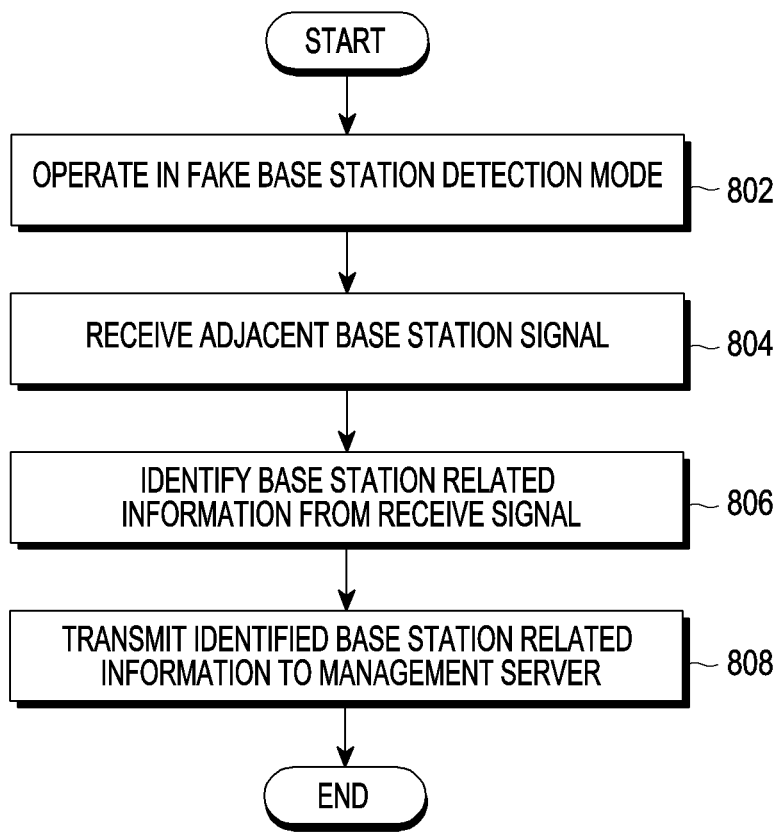
FIG. 8A is a flowchart illustrating a method for transmitting information on a fake base station by a normal base station according to various embodiments.

FIG. 8A is a flowchart illustrating a method for transmitting information on a fake base station by a normal base station according to various embodiments. Referring to FIG.

8A, a normal base station 110 may operate in a fake base station detection mode in operation 802. According to various embodiments, as the normal base station 110 operates as a user equipment, the normal base station 110 may receive a signal transmitted from at least one base station adjacent to the normal base station 110 in operation 804. According to various embodiments, when at least one fake base station (BS) 120 exists in a location adjacent to the normal base station 110, the normal base station 110 may receive a signal transmitted from the fake base station 120 in operation 804.

The normal base station 110 may receive a signal transmitted from an adjacent base station, and may identify base station-related information from the received signal in operation 806. According to various embodiments, the normal base station 110 may obtain, based on a PSS and/or SSS received from an adjacent base station including the fake base station 120, cell identification information (cell ID) (for example, a physical cell ID) on a base station that has transmitted the corresponding signal. According to various embodiments, the normal base station 110 may identify, based on the PSS and/or SSS received from an adjacent base station including the fake base station 120, system information received from the adjacent base station.

For example, an MIB among the identified system information may include at least one of information on downlink cell bandwidth, information on a physical hybrid-ARQ indicator channel (PHICH) configuration of a cell, and a system frame number (SFN). Further, an SIB among the identified system information may include at least one of service provider information of the corresponding cell, configuration information of UL/DL subframe allocation, scheduling information of the SIB, information required for a terminal to access a cell (for example, information on uplink cell bandwidth, a random access parameter, a parameter related to uplink power control), and cell reselection related information.

According to various embodiments, adjacent base station information collected by the normal base station 110 may include at least one of cell identification information (cell ID), base station configuration information (for example, channel information or capability information), received signal strength (RSS) of adjacent base station, location information of a base station, channel state information (CSI) information, operation-related information (for example, operation time information), and system information. According to various embodiments, in addition to information listed above, various pieces of base station information that can be collected according to a mobile communication standard (for example, a long-term evolution (LTE) standard or a new radio (NR) standard) may be collected, and various embodiments are not limited to the above pieces of information.

The normal base station 110 may transmit the adjacent base station information collected by the normal base station 110 to the management server 130 in operation 808.

Figure 8B:
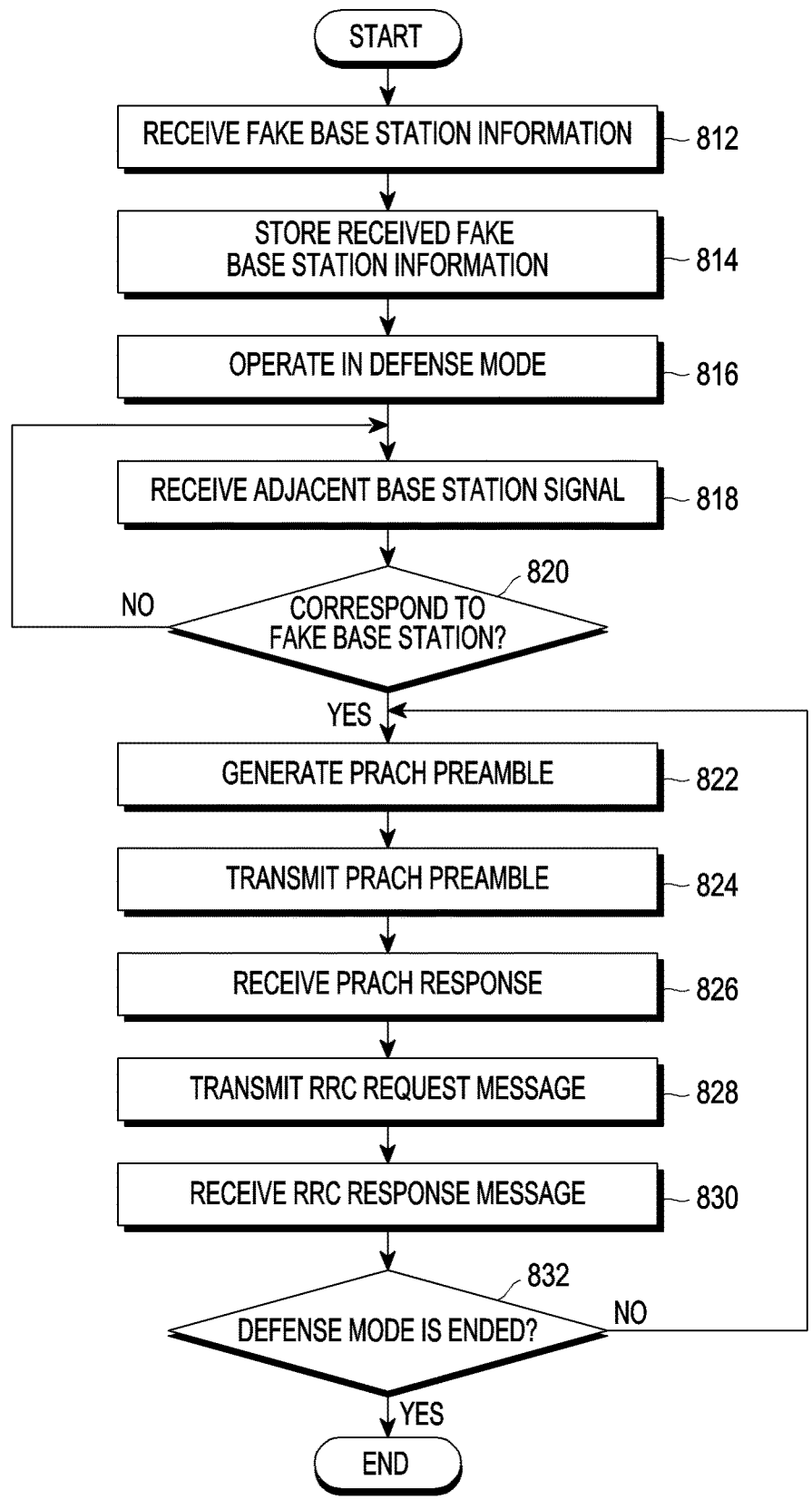
FIG. 8B is a signal flowchart illustrating a method for accessing a fake base station by a normal base station according to various embodiments.

FIG. 8B is a signal flowchart illustrating a method for accessing a fake base station by a normal base station according to various embodiments. Referring to FIG. 8B, according to various embodiments, a normal base station 110 determined as a defense base station may receive information about the fake base station 120 from a management server 130 in operation 812. The normal base station 110 may store the received information regarding the fake base station in operation 814.

According to various embodiments, the normal base station 110 may operate in a defense mode in operation 816. As the normal base station 110 operates in a defense mode, the normal base station 110 may receive signals from adjacent base stations, which can be the fake base station 120, in operation 818. According to various embodiments, a signal received by the normal base station 110 corresponds to a signal transmitted from at least one adjacent base station, and may include at least one piece of information used for cell search. According to various embodiments, the normal base station 110 may obtain, based on the PSS and/or SSS received from an adjacent base station, frequency synchronization, symbol synchronization, or frame synchronization for communication with the corresponding base station. According to various embodiments, the normal base station 110 may obtain, based on the PSS and/or SSS received from an adjacent base station which can be the fake base station 120, cell identification information (cell ID) on the base station having transmitted the corresponding signal. According to various embodiments, the normal base station 110 may identify, based on the PSS and/or SSS received from an adjacent base station, system information received from the adjacent base station. For example, the identified system information may include the MIB or SIB.

The normal base station 110 may determine whether a signal, which is received from an adjacent base station, corresponds to information on a fake base station received from the management server 130 in operation 820.

More specifically, the normal base station 110 may identify cell identification information (cell ID) from a signal transmitted from a specific base station, and when the identified cell identification information corresponds to the cell identification information of a fake base station, received from the management server 130, may determine that the specific base station is a fake base station. According to another embodiment, the normal base station 110 may, based on a signal transmitted from a specific base station (for example, based on RSS information), determine location information of the corresponding base station, and when the identified location information corresponds to location information of a fake base station, received from the management server 130, may determine that the specific base station is a fake base station.

According to various embodiments, the normal base station 110 may generate a PRACH preamble based on the signal transmitted from the specific base station determined as the fake base station 120, in operation 822, and may transmit the generated PRACH preamble in operation 824. The normal base station 110 may receive a PRACH response message from the fake base station 120 in operation 826. The normal base station 110 may transmit an RRC request message to the fake base station 120 in operation 828. The normal base station 110 may receive an RRC response message from the fake base station 120 in operation 830.

The normal base station 110 may repeatedly perform transmission of the PRACH preamble and transmission of the RRC request message until a defense mode ends in operation 832, to thereby cause radio resources of the fake base station to be all exhausted.

Figure 9A:
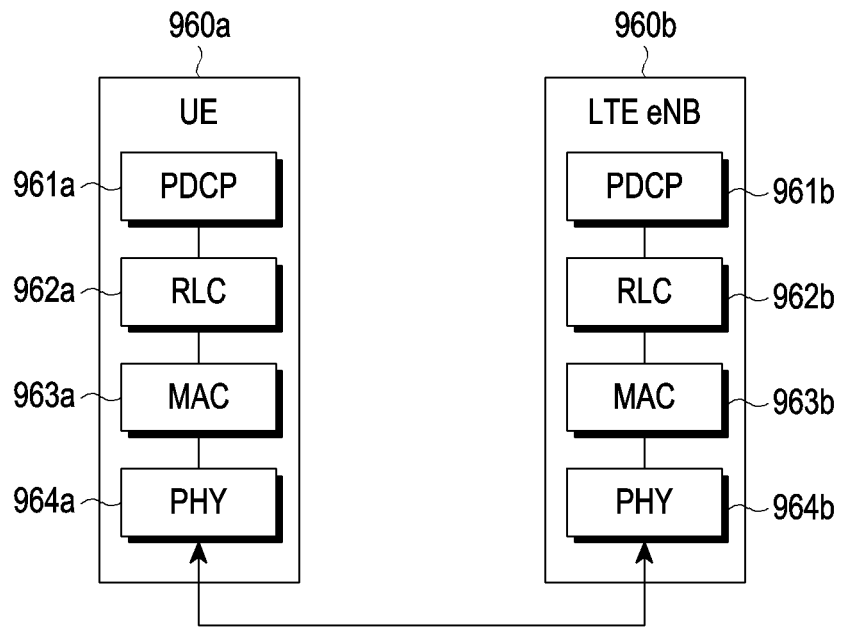
FIG. 9A, FIG. 9B, and FIG. 9C are block diagrams illustrating a protocol configuration of a base station according to various embodiments.
Figure 9B:
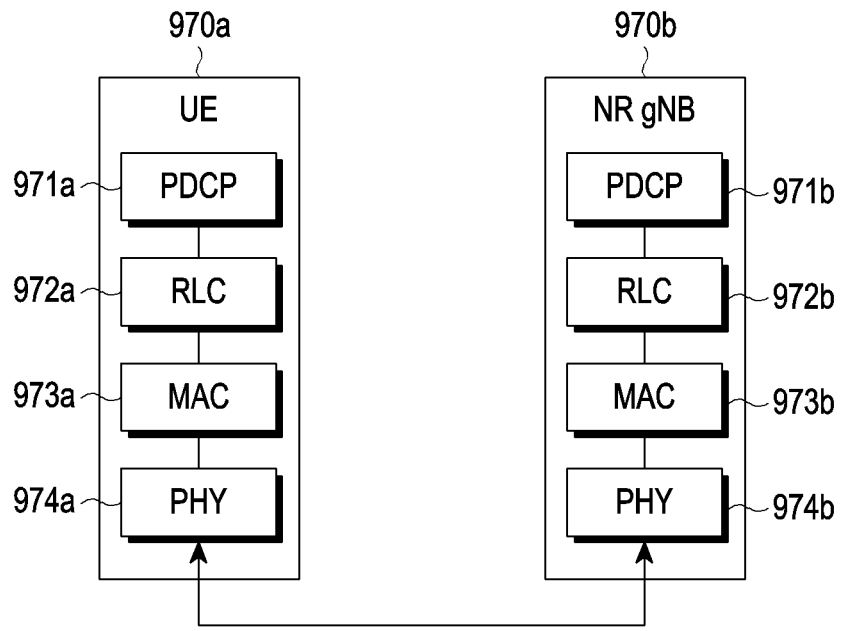
Figure 9C:
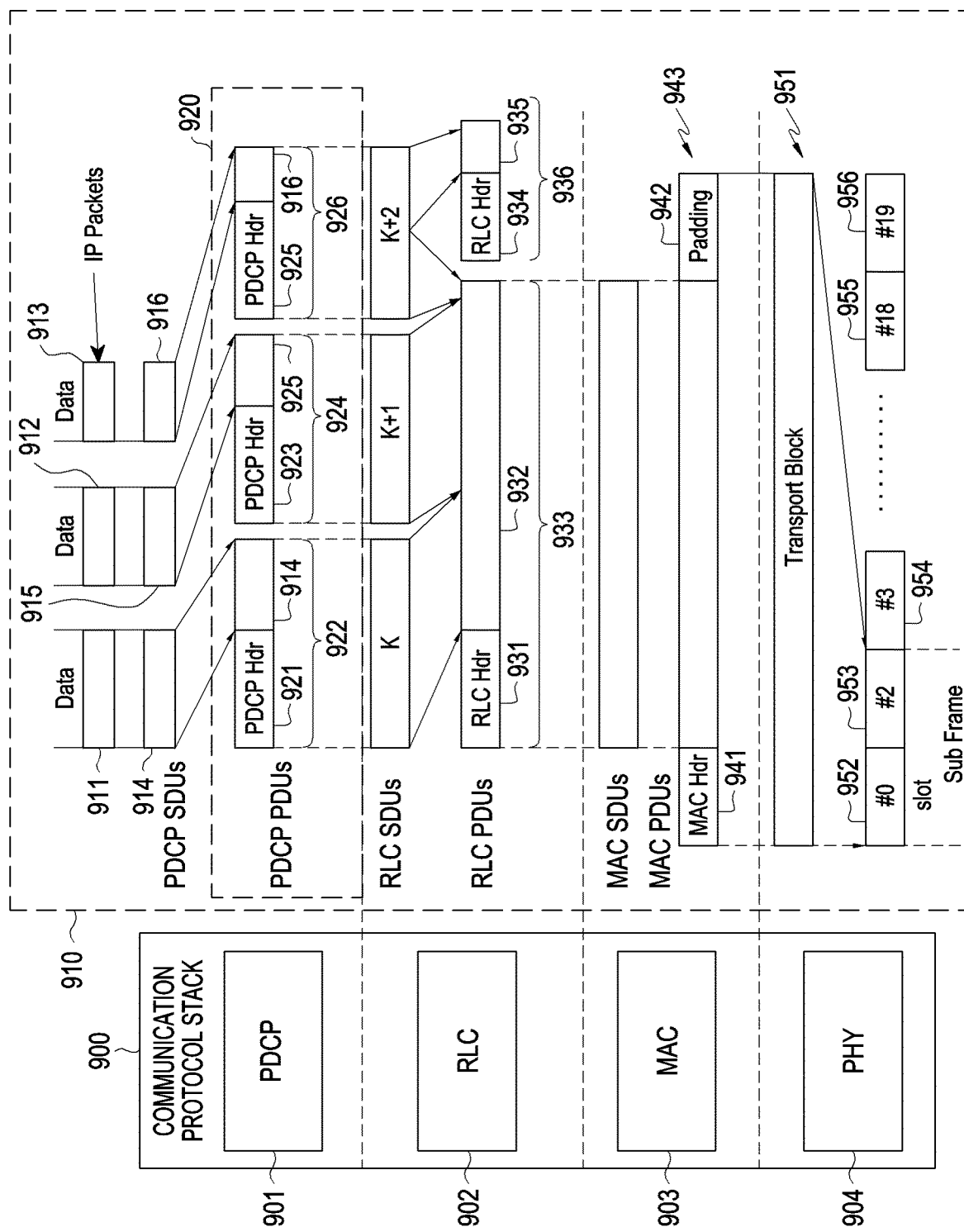

FIGS. 9A, 9B, and 9C are block diagrams illustrating a protocol configuration of a base station according to various embodiments. FIG. 9A illustrates a radio protocol structure in an LTE system.

Referring to FIG. 9A, according to various embodiments, a radio protocol stack of the LTE system may include packet data convergence protocol entities (PDCPs) 961*a*, and 961*b*, radio link control entities (RLCs) 962*a* and 962*b*, medium access controls (MACs) 963*a* and 963*b*, and physical entities (PHYs) 964*a* and 964*b*, in a UE 960*a* and an LTE eNB 960*b*, respectively.

According to various embodiments, the packet data convergence protocols (PDCPs) 961a, and 961b are used to perform operations, such as IP header compression/reconstruction. The main functions of PDCPs are summarized as follows:

Header compression and decompression: ROHC only
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM)
Ciphering and deciphering
Timer-based service data unit (SDU) discard in uplink According to various embodiments, the radio link controls (hereinafter referred to as RLCs) 962a and 962b may perform an ARQ operation and the like by reconfiguring a PDCP protocol data unit (PDU) to an appropriate size. The main functions of RLC are summarized as follows:

Transfer of upper layer PDUs
ARQ function (Error correction through ARQ (only for AM data transfer))
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment According to various embodiments, the MACs 963a and 963b are connected to multiple RLC layer devices configured in one UE, and may perform an operation of multiplexing RLC PDUs to MAC PDUs and de-multiplexing RLC PDUs from MAC PDUs. The main functions of MAC are summarized as follows.

Mapping between logical channels and transport channels
Multiplexing/de-multiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
Multimedia broadcast multicast service (MBMS) identification
Transport format selection
Padding According to various embodiments, the PHYs 964a and 964b may perform operations of channel coding and modulating upper layer data, forming the upper layer data into an OFDM symbol, transmitting the OFDM symbol through a radio channel, or of demodulating an OFDM symbol received through a radio channel, channel-decoding the OFDM symbol, and transmitting the OFDM symbol to an upper layer.

FIG. 9B illustrates a radio protocol structure of a next-generation mobile communication system according to various embodiments.

Referring to FIG. 9B, according to various embodiments, the radio protocol stack of the next-generation mobile communication system may include NR PDCPs 971a, and 971b, NR RLCs 972a and 972b, NR MACs 973a and 973b, and NR PHYs 974a and 974b in a UE 970a and an NR base station (gNB) 970b, respectively. Although not shown, the radio protocol stack of the next-generation mobile communication system may further include a service data adaptation protocol (SDAP) in the UE 970a and the NR base station (gNB) 970b, respectively. The SDAP may manage radio bearer assignment based on, for example, quality of service (QoS) of user data.

According to various embodiments, the main functions of the NR PDCPs 971a, and 971b may include some of the following functions:

Header compression and decompression: ROHC only
Transfer of user data
In-sequence delivery of upper layer PDUs
Sequence reordering (PDCP PDU reordering for reception)
Duplicate detection of lower layer SDUs
Retransmission of PDCP SDUs
Ciphering and deciphering
Timer-based SDU discard in uplink According to various embodiments, in the above, the reordering function of the NR PDCP device may refer to a function of sequentially reordering PDCP PDUs, received from a lower layer, based on a PDCP sequence number (SN), and may include a function of transmitting data to an upper layer in the reordered sequence, a function of reordering the sequence and recording lost PDCP PDUs, a function of providing a state report on the lost PDCP PDUs to a transmission side, and a function of requesting retransmission of the lost PDCP PDUs.

According to various embodiments, the main functions of the NR RLCs 972a and 972b may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment According to various embodiments, in the above, the in-sequence delivery function of the NR RLC device refers to a function of transmitting RLC SDUs, received from a lower layer, to an upper layer in sequence. The in-sequence delivery function of the NR RLC device may include, when one RLC SDU is originally segmented into multiple RLC SDUs and received, a function of reassembling and transmitting the multiple RLC SDUs, a function of reordering the received RLC PDUs based on an RLC sequence number (SN) or PDCP sequence number (SN), a function of reordering the sequence and recording lost RLC PDUs, a function of providing a state report on the lost RLC PDUs to a transmission side, a function of requesting retransmission of the lost RLC PDUs, a function of sequentially transmitting only RLC SDUs prior to the lost RLC SDU to an upper layer when there is a lost RLC SDU, a function of sequentially transmitting all the RLC SDUs received before a predetermined timer starts to an upper layer when a predetermined timer has expired even if there is a lost RLC SDU, or a function of sequentially transmitting all RLC SDUs received so far to an upper layer when a predetermined timer has expired even when there is a lost RLC SDU. In the above, the out-of-sequence delivery function of the NR RLC device may refer to a function of directly transmitting the RLC SDUs, received from the lower layer, to an upper layer regardless of the sequence thereof. The out-of-sequence delivery function of the RLC device may include, when one RLC SDU has been originally segmented into multiple RLC SDUs and received, a function of reassembling the multiple RLC SDUs and transmitting the same, and a function of storing the RLC SN or PDCP SN of the received RLC PDUs, ordering the sequence, and recording the lost RLC PDUs.

According to various embodiments, the NR MACs 973a and 973b may be connected to multiple NR RLC layer devices configured in one UE, and the main function of the NR MAC may include some of the following functions.

Mapping between logical channels and transport channels
Multiplexing/de-multiplexing of MAC SDUs
Scheduling information reporting
Error correction through HARQ
Priority handling between logical channels of one UE
Priority handling between UEs by means of dynamic scheduling
MBMS service identification
Transport format selection
Padding According to various embodiments, the NR PHY layers 974a and 974b may perform operations of channel-coding and modulating upper layer data, forming the upper layer data into an OFDM symbol, transmitting the OFDM symbol via a radio channel or demodulating and channel decoding of the OFDM symbol received via the radio channel, and transferring the OFDM symbol to an upper layer.

According to various embodiments, <Table 1> below describes information that may be included in a MAC header.

Referring to FIG. 9C, a communication protocol stack 900 of an electronic device (e.g., the electronic device 100) according to various embodiments may include a PDCP entity 901, an RLC entity 902, a MAC entity 903, and a PHY entity 904. The PDCP entity 901, the RLC entity 902, the MAC entity 903, and the PHY entity 904 may be entities based on the radio protocol of the LTE system or entities based on the radio protocol of the NR system. For example, when the electronic device performs LTE-based data transmission or reception, the PDCP entity 901, the RLC entity 902, the MAC entity 903, and the PHY entity 904 based on the radio protocol of the LTE system may be configured. For example, when the electronic device performs NR-based data transmission or reception, the PDCP entity 901, the RLC entity 902, the MAC entity 903, and the PHY entity 904 based on the radio protocol of the NR system may be configured. For example, as shown in FIG. 9C, packet data processed based on the PDCP entity 901, the RLC entity 902, the MAC entity 903, and the PHY entity 904 may be stored at least temporarily in a partial logical area or a partial physical area of the memory 910 of the electronic device. According to various embodiments, the PDCP entity 901 may further include PDCP headers 921, 923, and 925 in the PDCP SDUs 914, 915, and 916 based on data 911, 912, and 913, which are Internet protocol (IP) packets, respectively, and may perform delivery of PDCP PDUs 922, 924, and 926. Information of the PDCP header delivered by the LTE PDCP entity may be different from the PDCP header information delivered by the NR PDCP entity. According to various embodiments, a PDCP buffer 920 may be implemented in a logical area or a physical area designated inside the memory 910. The PDCP buffer 920 may receive and at least temporarily store the PDCP SDUs 914, 915, and 916 based on the PDCP entity 901, and may further include PDCP headers 921, 923, and 925 in the PDCP SDUs 914, 915, and 916 and deliver the PDCP PDUs 922, 924, and 926.

According to various embodiments, the RLC entity 902 may add RLC headers 931 and 934 to first data 932 and second data 935, obtained by reconstructing the PDCP SDUs 922, 924 and 926, respectively, and deliver RLC PDUs 933 and 936. RLC header information based on LTE may be different from RLC header information based on NR.

TABLE 1

| Variable | Usage |
| --- | --- |
| LCID | LCID may indicate the identity of an RLC entity, which has generated an RLC PDU (or MAC SDU) received from a higher layer. Alternatively, LCID may indicate MAC control element (CE) or padding. Further, LCID may be defined differently according to a transmission channel. For example, LCID may be defined differently according to DL-SCH, UL-SCH, and MCH. |
| L | L indicates the length of a MAC SDU, and may indicate the length of a MAC CE having a variable length. In a case of a MAC CE having a fixed length, the L-field may be omitted. The L-field may be omitted for a predetermined reason. The predetermined reason refers to a case in which the size of the MAC SDU is fixed, notification of the MAC PDU size is provided from a transmitting side to a receiving side, or the length can be calculated by the receiving side through calculation. |
| F | F indicates the size of L-field. If L-field does not exist, indication may be omitted, and if the F-field exists, the size of L-field may be limited to a predetermined size. |
| F2 | F2 indicates the size of L-field. If the L-field does not exist, indication may be omitted, and if the F2-field exists, the size of L-field may be limited to a predetermined size different from that of F-field. For example, F2-field may indicate a size larger than that of F-field. |
| E | E indicates whether MAC header includes other headers. For example, if E has a value of 1, other MAC header variables may be accompanied thereafter. However, if E has a value of 0, MAC SDU, MAC CE, or padding may be accompanied thereafter. |
| R | R is a reserved bit. |

According to various embodiments, the MAC entity 903 may add a MAC header 941 and padding 942 to a MAC SDU to deliver the MAC PDU 943, which is a transport block 951 and may be processed in the physical layer (e.g. in PHY entity 904). The transport block 951 may be processed to generate slots 952, 953, 954, 955, and 956.

According to various embodiments, although not shown in FIG. 9C, the memory 910 may include buffers corresponding to the RLC layer and the MAC layer, respectively.

Figure 10:
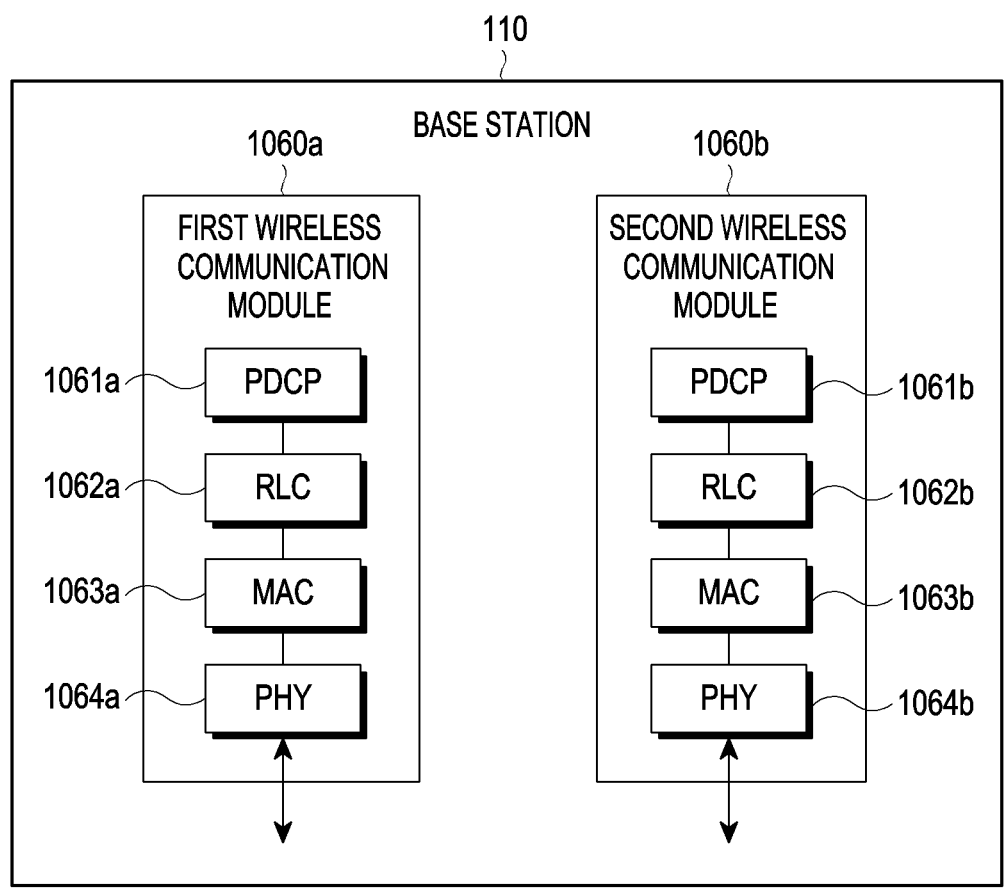
FIG. 10 is a block diagram illustrating a protocol configuration of a base station according to various embodiments.

FIG. 10 is a block diagram illustrating a protocol configuration of a base station according to various embodiments. Referring to FIG. 10, the normal base station 110 according to various embodiments may include a first wireless communication module 1060a and a second wireless communication module 1060b. The first wireless communication module 1060a may include a packet data convergence protocol entity (PDCP) 1061a, a radio link control entity (RLC) 1062a, a medium access control entity (MAC) 1063a, and a physical entity (PHY) 1064a. Further, the second wireless communication module 1060b may include a PDCP 1061b, an RLC 1062b, a MAC 1063b, and a PHY 1064b.

The first wireless communication module 1060a may be a module in which the normal base station 110 processes messages transmitted or received to or from a user terminal in order to operate as a general base station. The second wireless communication module 1060b may be a module in which the normal base station 110 processes messages transmitted or received to or from an adjacent base station in order to operate as the function of a user terminal so as to detect the fake base station 120 according to various embodiments.

Figure 11:
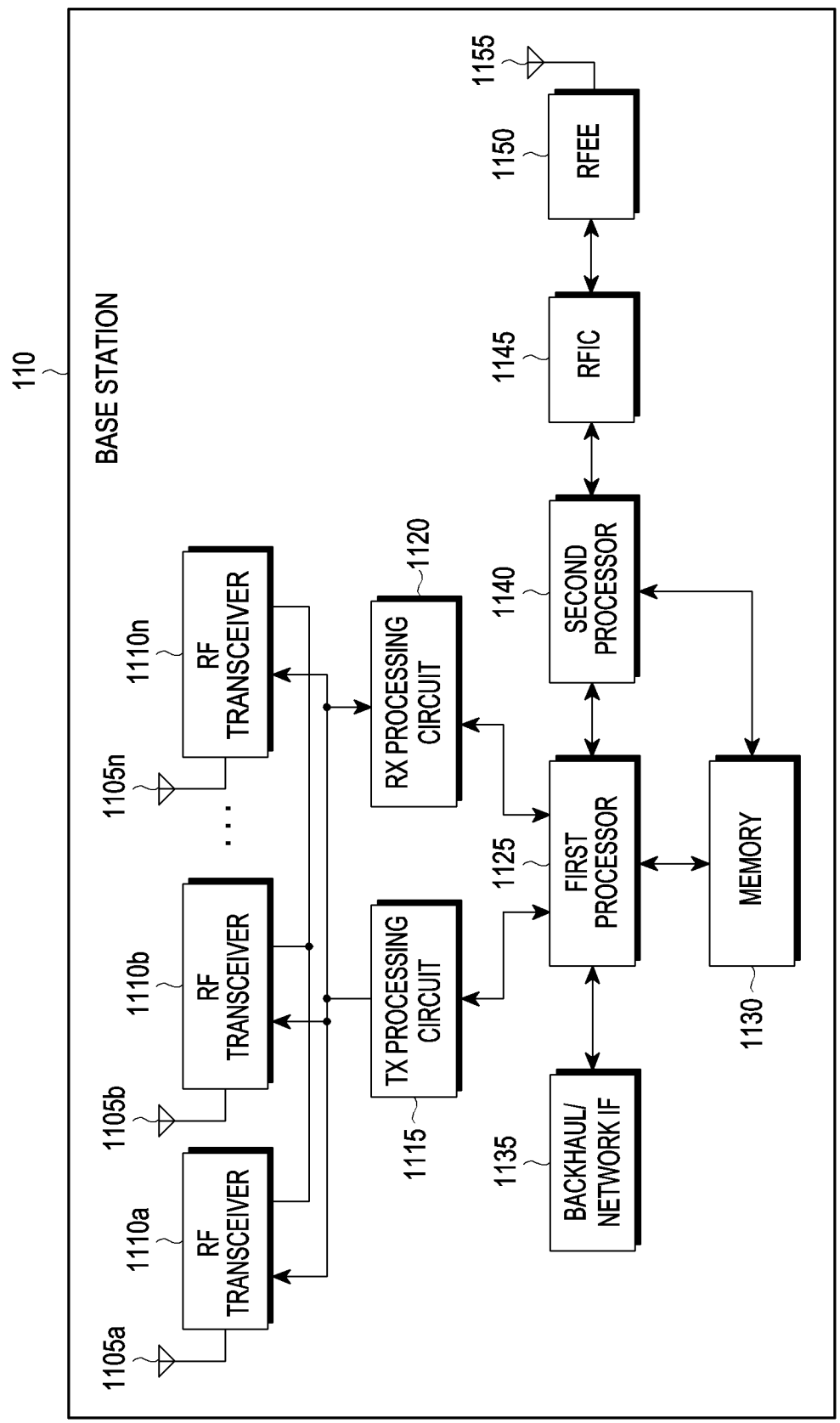
FIG. 11 is a block diagram illustrating a detailed configuration of a base station according to various embodiments.

FIG. 11 is a block diagram illustrating a detailed configuration of a base station according to various embodiments. Referring to FIG. 11, a normal base station 110 may include multiple antennas 1105a to 1105n, multiple RF transceivers 1110a to 1110n, a transmission (TX) processing circuit 1115, and a reception (RX) processing circuit 1120. The normal base station 110 may also include a first processor 1125, a memory 1130, and a backhaul/network interface 1135.

The RF transceivers 1110a to 1110n receive an RF signal transmitted from the electronic device 100 through the antennas 1105a to 1105n. The RF transceivers 1110a-1110n down-convert the received RF signal to generate an IF or baseband signal. The IF or baseband signal is transmitted to the RX processing circuit 1120 which generates a processed baseband signal, obtained by filtering, decoding, and/or digitizing the baseband or IF signal. The RX processing circuit 1120 transmits the processed baseband signal to the first processor 1125 for further processing.

The TX processing circuit 1115 receives analog or digital data from the first processor 1125. The TX processing circuit 1115 encodes, multiplexes, and/or digitizes the baseband data to be transmitted to generate a processed baseband or IF signal. The RF transceivers 1110a to 1110n receive, from the TX processing circuit 1115, the processed baseband or IF signal to be transmitted, and up-convert the baseband or IF signal into an RF signal transmitted through the antennas 1105a to 1105n.

The first processor 1125 may include one or more processors or other processing devices configured to control the overall operation of the normal base station 110. For example, the first processor 1125 may control the reception of a forward channel signal and the transmission of a reverse channel signal using the RF transceivers 1110a to 1110n, the RX processing circuit 1120, and the TX processing circuit 1115 according to well-known principles. The first processor 1125 may also support additional functions, such as more advanced wireless communication functions. For example, the first processor 1125 may support beamforming or directional routing operations in which signals transmitted from multiple antennas 1105a to 1105n are weighted differently to effectively steer outgoing signals in a desired direction. The first processor 1125 may also execute programs and other processes residing in the memory 1130 such as an OS. The first processor 1125 may move data into and out of the memory 1130 as required by the executing process. The first processor 1125 is also coupled to the backhaul/network interface 1135. The backhaul/network interface 1135 allows the normal base station 110 to communicate with other devices or systems via a backhaul connection or network. The backhaul/network interface 1135 may support communication via a predetermined suitable wired or wireless connection. For example, when the normal base station 110 is implemented as part of a cellular communication system, such as supporting 5G, LTE, or LTE-A, the backhaul/network interface 1135 may allow the normal base station 110 to communicate with other base stations via a wired or wireless backhaul connection. When the normal base station 110 is implemented as an access point, an interface 1135 may allow the normal base station 110 to communicate over a wired or wireless local area network or a larger network (such as the Internet) via a wired or wireless connection. The backhaul/network interface 1135 may include any suitable structure that supports communication via a wired or wireless connection, such as an Ethernet or RF transceiver. The memory 1130 may be coupled to the first processor 1125. A part of the memory 1130 may include a RAM, and the other parts of memory 1130 may include a flash memory or another ROM.

According to various embodiments, the first processor 1125 may process the function of the first wireless communication module 1060a described above in FIG. 10, and a second processor 1140 with like implementation may process the function of the second wireless communication module 1060b. When the normal base station 110 functions as a user terminal, the second processor 1140 may process the function of the second wireless communication module 1060b, perform signal processing of the processed data through an RFIC 1145 and an RFEE 1150, and then transmit the same through a second antenna 1155.

According to various embodiments, when the normal base station 110 functions as a user terminal, a signal transmitted from an adjacent base station, which may be the fake base station 120, is received through the second antenna 1155, and the signal is transferred to the RFEE 1150 and the RFIC 1145 to be received by the second processor 1140.

Figure 12:
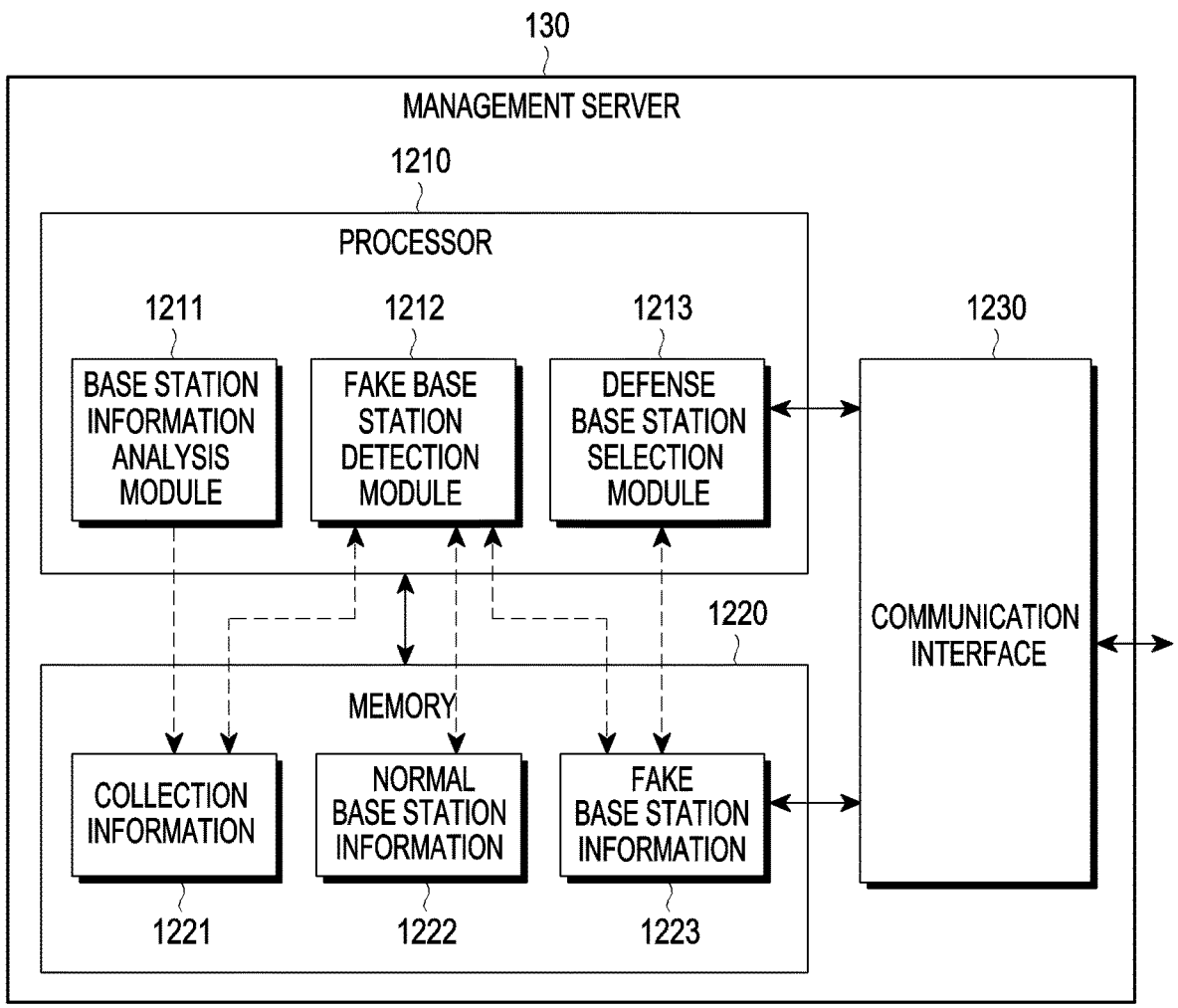
FIG. 12 is a block diagram illustrating a detailed configuration of a management server according to various embodiments.

FIG. 12 is a block diagram illustrating a detailed configuration of a management server according to various embodiments. Referring to FIG. 12, the management server 130 may include a processor 1210, a memory 1220, and a communication interface 1230. The processor 1210 may include a base station information analysis module 1211, a fake base station detection module 1212, and a defense base station selection module 1213. The memory 1220 may store collection information 1221, normal base station information 1222, and fake base station information 1223.

The base station information analysis module 1211 may receive adjacent base station information, collected by each normal base station 110, through the communication interface 1230 and analyze the received adjacent base station information. For example, the adjacent base station information collected by the normal base station 110 may include at least one of cell identification information (cell ID), base station configuration information (e.g., channel information or capability information), and received signal strength (RSS) of an adjacent base station, location information of a base station, channel state information (CSI) information, operation-related information (e.g., operation time information), and system information. According to various embodiments, in addition to information listed above, various pieces of base station information that can be collected according to a mobile communication standard (for example, a long-term evolution (LTE) standard or a new radio (NR) standard) may be collected, and various embodiments are not limited to the above pieces of information. The management server 130 may receive the adjacent base station information collected by the normal base station 110 and store the received adjacent base station information in the memory 1220 as the collection information 1221.

According to various embodiments, the adjacent base station information stored in the memory 1220 may be mapped with base station identification information corresponding to each adjacent base station information to be stored together therewith. The base station identification information may be specific cell identification information (cell ID) or identification information newly allocated to classify the adjacent base station information for each base station. According to various embodiments, when a PRACH preamble or an RRC request message is to be transmitted by a defense base station to a fake base station, the base station identification information may be used to identify the corresponding fake base station.

According to various embodiments, the base station information analysis module 1211 of the management server 130 may analyze at least one adjacent base station information received from the normal base station 110 or the electronic device 100. The fake base station detection module 1212 of the management server 130 may determine whether each adjacent base station information corresponds to a fake base station rather than a normal base station by comparing the analyzed adjacent base station information with base station-related information (e.g., normal base station information 1222) pre-stored in the memory 1220, to thereby detect the fake base station.

More specifically, the adjacent base station information, which is received from the normal base station 110 or the electronic device 100 by the management server 130, may include at least one of cell identification information (cell ID), base station configuration information (e.g., channel information or capability information), received signal strength (RSS) of an adjacent base station, location information of a base station, channel state information (CSI) information, operation-related information (e.g., operation time information), and system information. The base station information analysis module 1211 of the management server 130 may analyze the received adjacent base station information, the fake base station detection module 1212 may compare the analyzed information with pre-stored base station related information (e.g., normal base station information 1222), and thus it is possible to determine whether a base station corresponding to the corresponding adjacent base station information is a fake base station or a normal base station. The base station-related information (e.g., normal base station information 1222) stored in the management server 130 may be provided from a server of a communication service provider, and may include base station installation information (e.g., information of a location in which a base station is installed, cell identification information, base station configuration information, and base station operation information).

According to various embodiments, the fake base station detection module 1212 may compare location information of a corresponding adjacent base station, included in the adjacent base station information, with the pre-stored location information of the normal base station, and when as a result of the comparison, the two pieces of information differ by a configured distance or more, may determine a base station corresponding to the corresponding adjacent base station information as a fake base station. As another method, the fake base station detection module 1212 may estimate location information of a corresponding adjacent base station from RSS or CSI information included in the adjacent base station information, may compare the estimated location information with pre-stored location information of a normal base station, and when as a result of the comparison, the two pieces of information differ by a configured distance or more, may determine a base station corresponding to the corresponding adjacent base station information as a fake base station.

According to various embodiments, the fake base station detection module 1212 may identify antenna fingerprint information from CSI information for a corresponding adjacent base station included in the adjacent base station information and compare the identified antenna fingerprint information with pre-stored antenna fingerprint information of a normal base station, so as to determine whether the adjacent base station is a fake base station.

According to various embodiments, the fake base station detection module 1212 may identify operation information (e.g., operation information for each time zone) on the corresponding adjacent base station, included in the adjacent base station information, and compare the identified antenna fingerprint information with pre-stored operation information of a normal base station, so as to determine whether the adjacent base station is a fake base station.

According to various embodiments, the fake base station detection module 1212 may identify configuration information (e.g., channel information or capability information) for a corresponding adjacent base station, included in the adjacent base station information, and compare the identified configuration information with pre-stored configuration information of a normal base station, so as to determine whether the adjacent base station is a fake base station.

According to various embodiments, the fake base station detection module 1212 may compare multiple items (e.g., location information, antenna fingerprint information, operation information, and configuration information) analyzed from the received adjacent base station information with pre-stored information of a normal base station, and when a specific condition is satisfied (e.g., when as a result of the comparison, the analyzed information and the pre-stored information has a difference equal to or greater than a configured threshold), may determine the corresponding neighboring base station as a fake base station. The fake base station information 1223 determined by the fake base station detection module 1212 may be stored in the memory 1220.

According to various embodiments, the defense base station selection module 1213 of the management server 130 may select at least one base station to perform a defense operation against the determined (or detected) fake base station as a defense base station. A method for selecting the defense base station may be implemented using various methods. For example, the defense base station selection module 1213 may select, as a defense base station, the normal base station 110 belonging within a predetermined distance from a location, which is estimated with respect to the fake base station 120. According to various embodiments, the defense base station selection module 1213 may transmit the fake base station information to the selected defense base station through the communication interface 1230.

Figure 13:
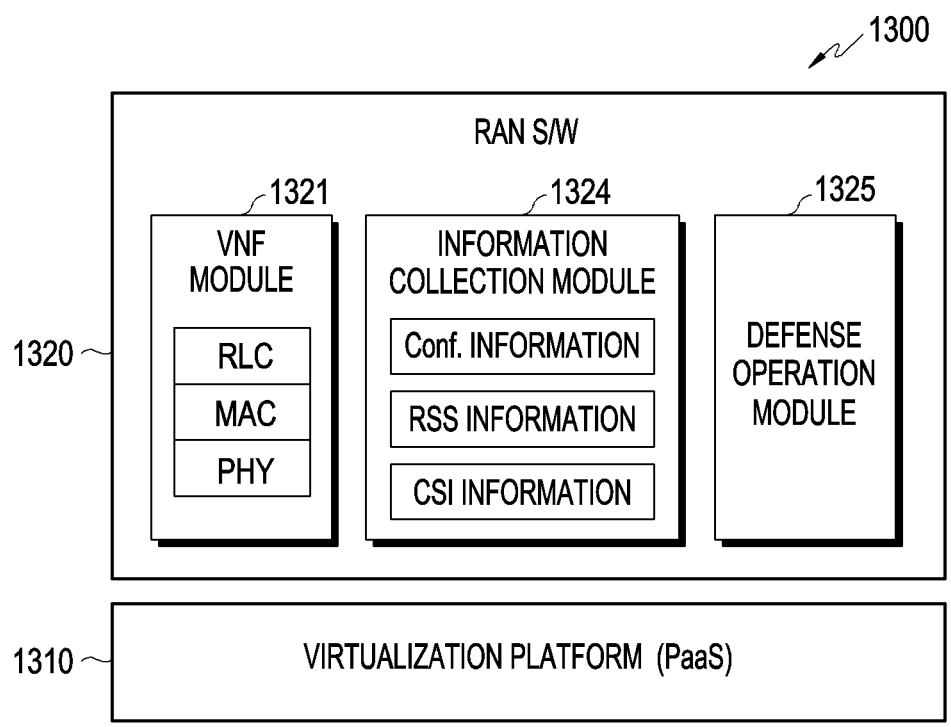
FIG. 13 is a block diagram illustrating a detailed configuration of a base station according to various embodiments.

FIG. 13 is a block diagram illustrating a detailed configuration of a base station according to various embodiments. Referring to FIG. 13, a normal base station 1300 (e.g., the normal base station 110 of FIG. 1) may implement at least one virtual network function (VNF) module 1321, an information collection module 1324, and a defense operation module 1325 on a virtualization platform 1310 by radio access network (RAN) software (S/W). The VNF module 1321 may provide a function in which the normal base station 1300 processes wireless communication data based on a wireless network protocol according to various embodiments. According to various embodiments, the VNF module 1321 may include at least a portion of functions performed by at least one virtual radio access network (vRAN) device. The VNF module 1321 may refer to a software module installed in various virtual machines (VMs) to perform network traffic processing, and each VNF module 1321 may perform a configured virtualized radio access network service or a part thereof. For example, the each VNF module 1321 may perform at least one radio access network function, which is performed by the normal base station 110, and may perform a function of at least one of a radio unit (RU), a digital unit (DU), a central/cloud unit (CU), and an access unit (AU) according to the radio network configuration type as shown in FIG. 2.

The VNF module 1321 may provide network functions and services that are dynamic and generally executable on an electronic device (or server) equipped with a general-purpose processor by separating a specific network function within a network device from basic hardware. When multiple VNF modules 1321 are arranged in the normal base station 110, the multiple VNF modules 1321 may perform the same or similar network functions, or may perform different network functions. The VNF module 1321 may replace at least one of various network equipment according to network functions to be performed, and the arrangement and role thereof may be configured in various forms.

According to various embodiments, the information collection module 1324 may perform a function in which the normal base station 1300 collects information from adjacent base stations including the fake base station 120 as described above. When the normal base station 1300 operates in a defense mode, the defense operation module 1325 may transmit a PRACH preamble message or an RRC request message to the fake base station 120 as described above, so as to perform a defense operation against the fake base station 120.

Figure 14:
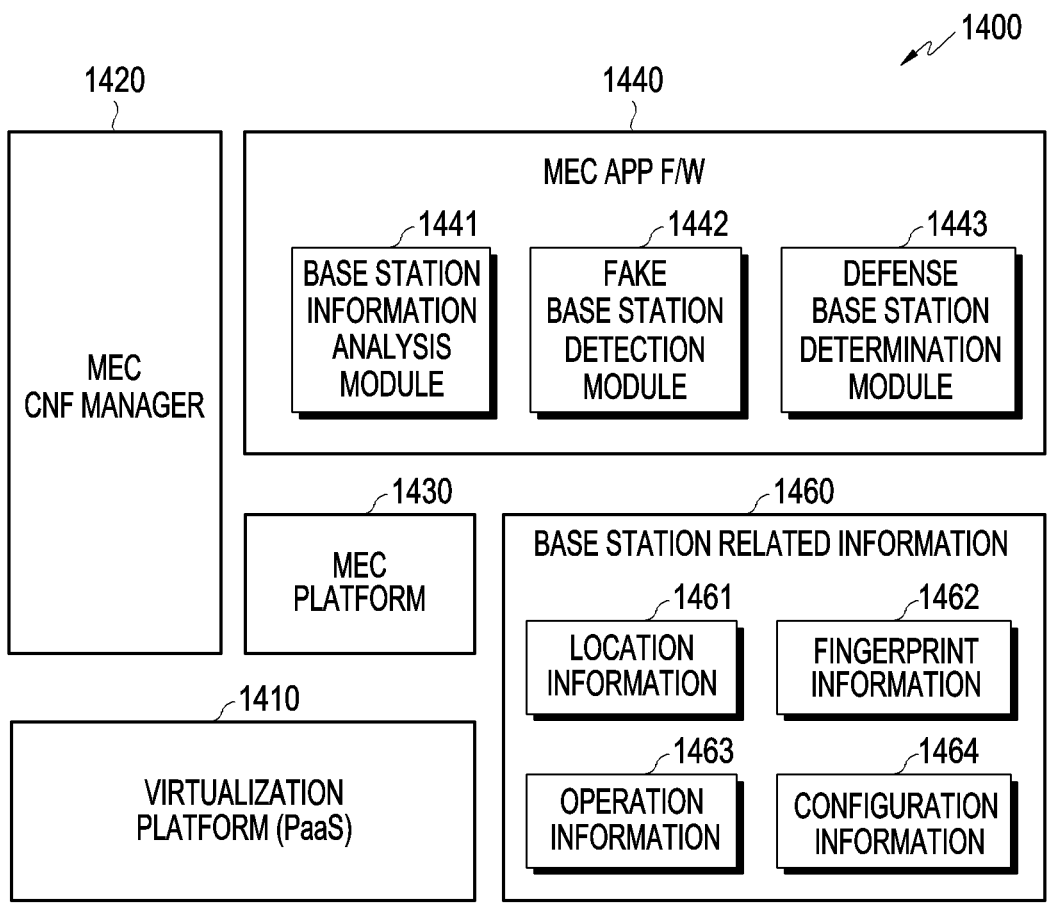
FIG. 14 is a block diagram illustrating a detailed configuration of a management server according to various embodiments.

FIG. 14 is a block diagram illustrating a detailed configuration of a management server according to various embodiments of the disclosure. Referring to FIG. 14, a management server 1400 (e.g., the management server 130 of FIG. 1) may be implemented in the form of a mobile edge computing (MEC) platform 1430 on a virtualization platform 1410 according to various embodiments. Here, a MEC CNF manager 1420 may manage functions such as installation, configuration change, and deletion of each module (e.g., a base station information analysis module 1441, a fake base station detection module 1442, and a defense base station determination module 1443) in a MEC application firmware 1440. The base station information analysis module 1441, the fake base station detection module 1442, and the defense base station determination module 1443 may correspond to the base station information analysis module 1211, the fake base station detection module 1212, and the defense base station selection module 1213 of FIG. 12, respectively, and a detailed description thereof will be omitted. According to various embodiments, the management server 1400 may store, in a memory, location information 1461, fingerprint information 1462, operation information 1463, and configuration information 1464 as base station-related information 1460.

Figure 15:
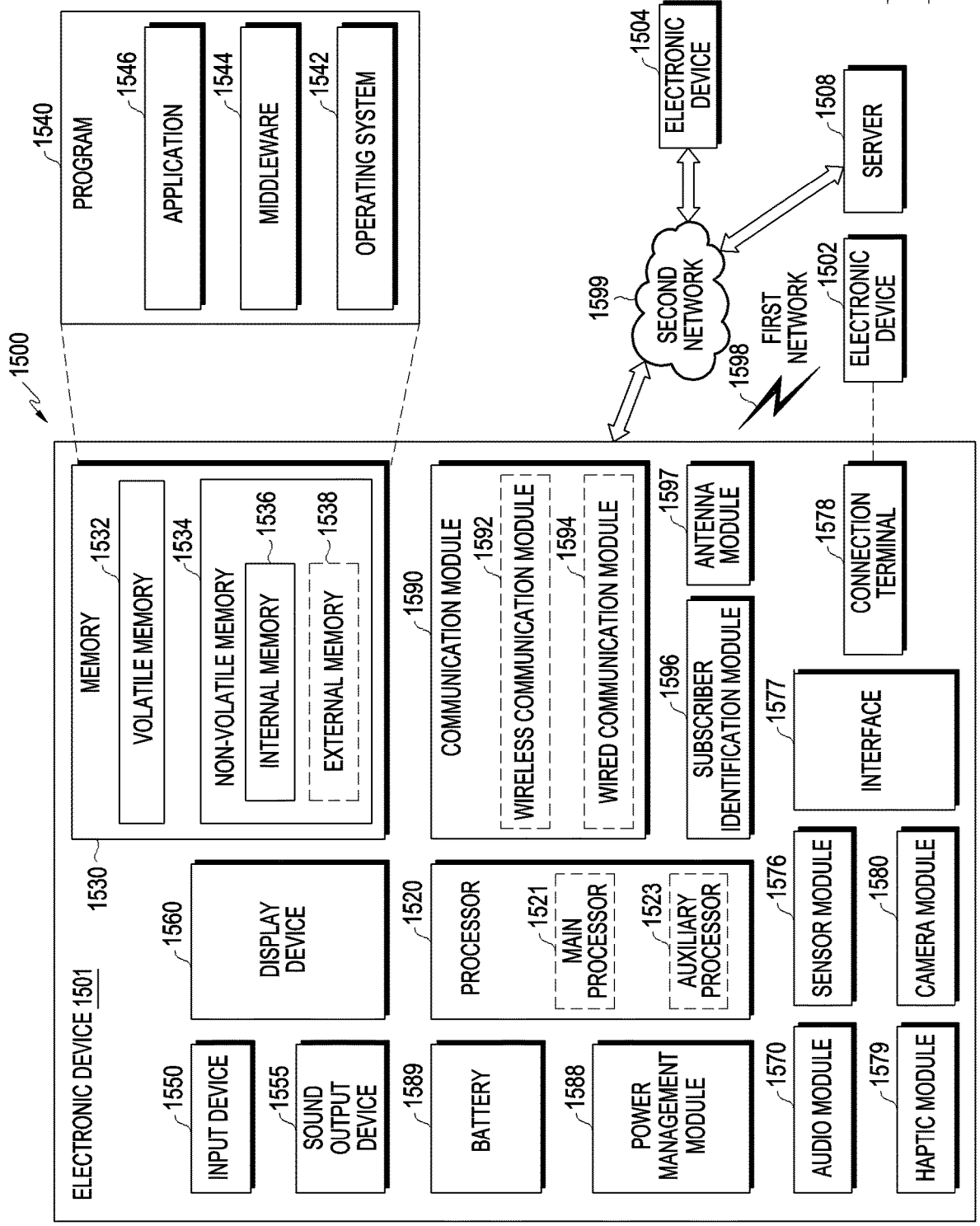
FIG. 15 is a block diagram illustrating an electronic device in a network environment according to various embodiments.

FIG. 15 is a block diagram of an electronic device 1501 (e.g., the electronic device 100 of FIG. 1) in a network environment 1500 according to various embodiments. Referring to FIG. 15, in a network environment 1500, the electronic device 1501 may communicate with an electronic device 1502 via a first network 1598 (e.g., short-range wireless communication), or may communicate with an electronic device 1504 or a server 1508 via a second network 1599 (e.g., long-distance wireless communication). According to an embodiment, the electronic device 1501 may communicate with the electronic device 1504 via the server 1508. According to an embodiment, the electronic device 1501 may include a processor 1520, a memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module 1596, and an antenna module 1597. According to an embodiment, in the electronic device 1501, at least one of the elements (e.g., the display device 1560 or the camera module 1580) may be omitted, or other element may be added. According to some embodiments, for example, like a sensor module 1576 (e.g., a fingerprint sensor, an iris sensor, or an illumination sensor) embedded in the display device 1560, some elements may be integrated and implemented.

The processor 1520 may control at least one other element (e.g., hardware or software element) of the electronic device 1501 connected to the processor 1520 by operating software (e.g., a program 1540), and may perform various data processing and operation. The processor 1520 may load a command or data received from another element (e.g., the sensor module 1576 or communication module 1590) to a volatile memory 1532, may process the same, and may store resultant data in a non-volatile memory 1534. According to an embodiment, the processor 1520 may include a main processor 1521 (e.g., a central processing device or an application processor) and a sub-processor 1523 (e.g., a graphic processing device, an image signaling processor, a sensor hub processor, or a communication processor) which operates independently from the main processor, additionally or alternatively uses low power when compared to the main processor 1521, or is specific to a designated function. Here, the sub-processor 1523 may operate separately from the main processor 1521 or may operate by being embedded in the main processor.

In this instance, the sub-processor 1523 may control at least some of the functions or states related to at least one element (e.g., a display device 1560, a sensor module 1576, or a communication module 1590) among the elements of the electronic device 1501, on behalf of the main processor 1521 while the main processor 1521 is in inactive state (e.g., sleep), or together with the main processor 1521 while the main processor 1521 is in an active state (e.g., performing an application). According to an embodiment, the sub-processor 1523 (e.g., an image signal processor or a communication processor) may be implemented as a part of functionally related another element (e.g., a camera module 1580 or a communication module 1590). The memory 1530 may store various data used by at least one element (e.g., the processor 1520 or the sensor module 1576) of the electronic device 1501, for example, software (e.g., the program 1540) and input data or output data associated with commands related to the software. The memory 1530 may include the volatile memory 1532 or the non-volatile memory 1534.

The program 1540 may include software stored in the memory 1530, for example, an operating system 1542, a middleware 1544, or an application 1546.

The input device 1550 may be a device for receiving, from the outside (e.g., a user) of the electronic device 1501, commands or data to be used for elements (e.g., the processor 1520) of the electronic device 1501, for example, a microphone, a mouse, or a keyboard.

The sound output device 1555 may be a device for outputting a sound signal to the outside of the electronic device 1501, and may include a speaker used for the general purpose such as multimedia reproduction or transcription playback, and a receiver dedicated to phone call reception. According to an embodiment, the receiver may be implemented separately or as being integrated with the speaker.

The display device 1560 is a device for visually providing information to the user of the electronic device 1501, and may include, for example, a display, a hologram device, or a projector, and a control circuit for controlling the corresponding device. According to an embodiment, the display device 1560 may include touch circuitry or a pressure sensor for measuring the strength of pressure on a touch.

The audio module 1570 may bilaterally convert sound and an electronic signal. According to an embodiment, the audio module 1570 may obtain sound via the input device 1550, or may output sound via the sound output device 1555 or an external electronic device (e.g., the electronic device 1502 (e.g., a speaker or headphone)) which is connected to the electronic device 1501 in a wired manner or wireless manner.

The sensor module 1576 may generate an electric signal or a data value corresponding to an internal operation state (e.g., the power or temperature) of the electronic device 1501 or an electric signal or a data value corresponding to the external environment state. The sensor module 1576 may include, for example, a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1577 may support a designated protocol which is connectable to an external electronic device (e.g., the electronic device 1502) in the wired manner or in the wireless manner. According to an embodiment, the interface 1577 may include a high definition multimedia interface (HDMI), a universal serial bus (USB) interface, an SD card interface, or an audio interface.

The connection terminal 1578 may include a connector which is capable of physically connecting the electronic device 1501 and an external electronic device (e.g., the electronic device 1502), for example, a HDMI connector, a USB connector, an SD card connector, or an audio connector (e.g., a headphone connector).

The haptic module 1579 may convert an electric signal into a mechanical stimulus (e.g., vibration or movement) or an electric stimulus which a user can recognize via a sense of touch or a movement sensation. The haptic module 1579 may include, for example, a motor, a piezoelectric device, or an electro-stimulator.

The camera module 1580 may shoot a still image and a video. According to an embodiment, the camera module 1580 may include one or more lens, an image sensor, an image signal processor, or a flash.

The power management module 1588 is a module for managing power supplied to the electronic device 1501, and may be implemented as, for example, at least a part of a power management integrated circuit (PMIC).

The battery 1589 is a device for supplying power to at least one element of the electronic device 1501, and may include, for example, a primary battery which is disposable, a secondary battery which is rechargeable, or a fuel battery.

The communication module 1590 may establish a wired or wireless communication channel between the electronic device 1501 and an external electronic device (e.g., the electronic device 1502, the electronic device 1504, or the server 1508), and may support performing communication via the established communication channel. The communication module 1590 may include one or more communication processors which are operated independently from the processor 1520 (e.g., an application processor), and support wired communication or wireless communication. According to an embodiment, the communication module 1590 may include a wireless communication module 1592 (e.g., a cellular communication module, a short-range wireless communication module, a global navigation satellite system (GNSS) communication module) or a wired communication module 1594 (e.g., a local area network (LAN) communication module or a power line communication module), and may communicate with an external electronic device using a corresponding communication module via the first network 1598 (e.g., a short-range communication network, such as Bluetooth, Wi-Fi direct, or infrared data association (IrDA)) or the second network 1599 (e.g., a long-distance communication network, such as a cellular network, the Internet, or a computer network (e.g., LAN or WAN)). The above-described various types of communication modules 1590 may be implemented as a single chip or may be implemented as different chips.

According to an embodiment, the wireless communication module 1592 may identify and authenticate the electronic device 1501 in a communication network using user information stored in the subscriber identification module 1596.

The antenna module 1597 may include one or more antennas for transmitting signals or power to the outside, or for receiving the same from the outside. According to an embodiment, the communication module 1590 (e.g., the wireless communication module 1592) may transmit a signal to the external electronic device or may receive a signal from the external electronic device, via an antenna appropriate for a communication scheme.

Some of the elements may be connected with each other via an inter-peripheral device communication scheme (e.g., a bus, a general purpose input/output (GPIO), a serial peripheral interface (SPI), or a mobile industry processor interface (MIPI)), and may mutually exchange signals (e.g., commands or data).

According to an embodiment, transmission or reception of commands or data may be performed between the electronic device 1501 and the external electronic device 1504 via the server 1508 connected to the second network 1599. The electronic devices 1502 and 1504 may be devices of the type, which is the same as or different from the type of the electronic device 1501. According to an embodiment, some or all of the operations executed by the electronic device 1501 may be performed by an external electronic device or multiple external electronic devices. According to an embodiment, when the electronic device 1501 has to perform some functions or services automatically or by request, the electronic device 1501 may request an external electronic device to perform at least some functions relating thereto instead of, or in addition to, performing the functions or services by itself. An external electronic device having received the request may execute the requested functions or additional functions, and may transfer the result thereof to the electronic device 1501. The electronic device 1501 may provide the received result as it is, or may additionally process the received result to provide the requested functions or services. To this end, for example, cloud computing, distributed computing, or client-server computing technology may be used.

A base station according to one of various embodiments may include: an antenna; a memory; and a processor. The processor may be configured to analyze a signal received through the antenna to thereby determine if a source of the received signal is a fake base station. The processor may also be configured, based on a determination that the source of the received signal is the fake base station, to generate a random access preamble signal for accessing the fake base station, the random access preamble signal being based on the received signal. The processor may also be configured to transmit the generated random access preamble signal through the antenna.

According to various embodiments, the analyzing of the received signal may include acquiring, from the received signal, information on an adjacent base station which transmitted the signal. The analyzing may also include transmitting the acquired information on the adjacent base station to a management server.

According to various embodiments, the information on the adjacent base station may include, at least one of cell identification information, channel information, capability information, received signal strength (RSS) information, or channel state information (CSI) information.

According to various embodiments, the processor may be further configured to receive fake base station information from the management server and store the received fake base station information in the memory. The analyzing of the received signal may further include comparing the received fake base station information to the received signal.

According to various embodiments, the processor may be further configured to receive a random access response signal from the fake base station through the antenna, and transmit a radio resource control (RRC) request message to the fake base station through the antenna.

According to various embodiments, the processor may be further configured to receive a radio resource control response (RRC response) message from the fake base station, and prevent transmission of an access completion message responsive to receipt of the radio resource control response message.

According to various embodiments, the processor may be further configured to repeat the transmission of the random preamble signal a predetermined number of times.

According to various embodiments, the processor may be further configured, when repeating transmission of the random access preamble signal, to transmit the random access preamble signal in a preamble sequence, configured based on preconfigured different indices.

According to various embodiments, the processor may be further configured to repeat the transmission of the radio resource control request message a predetermined number of times.

According to various embodiments, the processor may be further configured, when repeating transmission of the random access preamble signal, control to include terminal temporary identification information in the random access preamble signal to be transmitted, the terminal temporary identification information being generated based on preconfigured different indices.

According to various embodiments, the analyzing of the signal may include acquiring cell identification information from the received signal. The determination that the source of the analyzed signal is the fake base station may be based on a correspondence between the acquired cell identification information and fake base station information stored in the memory.

A management server according to one of various embodiments may include: a communication interface; and a processor. The processor may be configured to receive, through the communication interface, base station-related information transmitted from at least one base station or at least one electronic device. The processor may also be configured to determine whether the received base station-related information corresponds to information on a fake base station. The processor may also be configured, based on a determination that the received based station-related information corresponds to the information on the fake base station, to select at least one normal base station as a base station for performing a defense mode against the fake base station. The processor may also be configured to transmit identification information for the fake base station to the selected at least one normal base station through the communication interface.

According to various embodiments, the received base station-related information may include at least one of: cell identification information, channel information, capability information, received signal strength (RSS) information, or channel state information (CSI) information.

According to various embodiments, the processor may be further configured to identify a preconfigured tracking area (TA), and to select the at least one normal base station from at least one normal base station in the identified tracking area.

According to various embodiments, the processor may be further configured to transmit an index for generation of a sequence of a random access preamble.

According to various embodiments, the processor may be further configured to transmit, to the selected at least one normal base station, an index for generation of terminal temporary identification information included in a radio resource control request message.

A method for defending against an attack from a fake base station in a communication network according to one of various embodiments may include: on a processor of a base station, analyzing a signal received to thereby determine if a source of the received signal is a fake base station. The method may also include, based on a determination that the source of the received signal is the fake base station, on a processor of a base station, generating a random access preamble signal for accessing the fake base station, the random access preamble signal being based on the received signal. The method may also include transmitting the generated random access preamble signal through an antennae.

According to various embodiments, the method may further include: receiving a signal, which is transmitted from an adjacent base station, through the antenna; analyzing the received signal to acquire information on the adjacent base station; and transmitting the acquired information on the adjacent base station to a management server.

According to various embodiments, the information on the adjacent base station may include at least one of: cell identification information, channel information, capability information, received signal strength (RSS) information, or channel state information (CSI) information.

A method for defending against an attack from a fake base station in a communication network according to one of various embodiments may include receiving, through a communication interface, base station-related information transmitted from at least one base station or at least one electronic device. The method may also include determining, on a processor, whether the received base station-related information corresponds to information on a fake base station. The method may also include, based on a determination that the received based station-related information corresponds to the information on the fake base station, selecting at least one normal base station as a base station for performing a defense mode against the fake base station. The method may also include transmitting identification information for the fake base station to the selected at least one normal base station through the communication interface.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one/or of A and B," "A, B, or C," "at least one of A, B, and/or C" may include all possible combinations of the items enumerated together in a corresponding one of the phrases. As used herein, such terms as "a first", "a second", "the first", and "the second" may modify corresponding elements regardless of the importance or order thereof, and are used to simply distinguish a corresponding element from another and does not limit the elements. It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via another element (e.g., a third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., a computer). The machine is a device that can invoke the stored instructions from the storage medium and operate according to the invoked instructions, and may include the electronic device according to the embodiments set forth herein. When the instructions are executed by a processor (e.g., the controller 310), the processor may perform functions corresponding to the instructions, with or without using other components under the control of the processor. The instructions may include codes generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the above-described sub elements may be omitted or other sub elements may be further included in various embodiments. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The embodiments of the disclosure described and shown in the specification and the drawings are merely specific examples that have been presented to easily explain the technical contents of the disclosure and help understanding of the disclosure, and are not intended to limit the scope of embodiments of the disclosure. Therefore, the scope of the disclosure should be construed to include, in addition to the embodiments disclosed herein, all changes and modifications derived on the basis of the technical idea of various embodiments of the disclosure.

What is claimed is:

1. A base station comprising:
   an antenna;
   a memory; and
   a processor configured to:
   analyze a signal received through the antenna to determine if a source of the received signal is a fake base station,
   based on a determination that the source of the received signal is the fake base station, generate a random access preamble signal for accessing the fake base station, the random access preamble signal being based on the received signal, and
   transmit the generated random access preamble signal through the antenna.

2. The base station of claim 1, wherein the analyzing of the received signal includes:
acquiring, from the received signal, information on an adjacent base station which transmitted the signal, and
transmitting the acquired information on the adjacent base station to a management server.

3. The base station of claim 2, wherein the information on the adjacent base station includes at least one of:
cell identification information, channel information, capability information, received signal strength (RSS) information, or channel state information (CSI) information.

4. The base station of claim 2, wherein the processor is further configured to:
receive fake base station information from the management server and store the received fake base station information in the memory; and
wherein the analyzing of the received signal further includes comparing the received fake base station information to the received signal.

5. The base station of claim 1, wherein the processor is further configured to:
receive a random access response signal from the fake base station through the antenna, and
transmit a radio resource control (RRC) request message to the fake base station through the antenna.

6. The base station of claim 5, wherein the processor is further configured to:
receive a radio resource control response (RRC response) message from the fake base station, and
prevent transmission of an access completion message responsive to receipt of the radio resource control response message.

7. The base station of claim 1, wherein the processor is further configured to:
repeat the transmission of the random preamble signal a predetermined number of times.

8. The base station of claim 7, wherein the processor is further configured to:
when repeating transmission of the random access preamble signal, transmit the random access preamble signal in a preamble sequence configured based on preconfigured different indices.

9. The base station of claim 5, wherein the processor is further configured to:
repeat the transmission of the radio resource control request message a predetermined number of times.

10. The base station of claim 9, wherein the processor is further configured to:
when repeating transmission of the random access preamble signal, include terminal temporary identification information in the random access preamble signal to be transmitted, the terminal temporary identification information being generated based on preconfigured different indices.

11. The base station of claim 1, wherein the analyzing of the signal includes acquiring cell identification information from the received signal, and
wherein the determination that the source of the analyzed signal is the fake base station is based on a correspondence between the acquired cell identification information and fake base station information stored in the memory.

12. A management server comprising:
a communication interface; and
a processor configured to:
receive, through the communication interface, base station-related information transmitted from at least one base station or at least one electronic device,
determine whether the received base station-related information corresponds to information on a fake base station,
based on a determination that the received based station-related information corresponds to the information on the fake base station, select at least one normal base station as a base station for performing a defense mode against the fake base station, and
transmit identification information for the fake base station to the selected at least one normal base station through the communication interface.

13. The management server of claim 12, wherein the received base station-related information includes at least one of:
cell identification information, channel information, capability information, received signal strength (RSS) information, or channel state information (CSI) information.

14. The management server of claim 12, wherein the processor is further configured to:
identify a preconfigured tracking area (TA), and
select the at least one normal base station from at least one normal base station in the identified tracking area.

15. The management server of claim 12, wherein the processor is further configured to:
transmit, to the selected normal base station, an index for generation of a sequence of a random access preamble.

16. The management server of claim 12, wherein the processor is further configured to:
transmit, to the selected normal base station, an index for generation of terminal temporary identification information included in a radio resource control request message.

17. A method for defending against an attack from a fake base station in a communication network, the method comprising:
on a processor of a base station, analyzing a signal received to thereby determine if a source of the received signal is a fake base station,
based on a determination that the source of the received signal is the fake base station, on a processor of a base station, generating a random access preamble signal for accessing the fake base station, the random access preamble signal being based on the received signal, and
transmitting the generated random access preamble signal through an antennae.

18. The method of claim 17, wherein the analyzing of the received signal includes:
acquiring, from the received signal, information on an adjacent base station which transmitted the signal; and
transmitting the acquired information on the adjacent base station to a management server.

19. The method of claim 18, wherein the information on the adjacent base station includes:
at least one of cell identification information, channel information, capability information, received signal strength (RSS) information, or channel state information (CSI) information.

20. The method of claim 17, further comprising:
receiving a random access response signal from the fake base station through the antenna, and
transmitting a radio resource control (RRC) request message to the fake base station through the antenna.

* * * * *